(12) United States Patent  (10) Patent No.: US 7,424,612 B2
England et al.  (45) Date of Patent: Sep. 9, 2008

(54) SAVING AND RETRIEVING DATA BASED ON SYMMETRIC KEY ENCRYPTION

(75) Inventors: Paul England, Bellevue, WA (US); Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/557,620

(22) Filed: Nov. 8, 2006

(65) Prior Publication Data

US 2007/0088946 A1  Apr. 19, 2007

Related U.S. Application Data

(62) Division of application No. 10/406,861, filed on Apr. 4, 2003.

(60) Provisional application No. 60/373,505, filed on Apr. 17, 2002.

(51) Int. Cl.
  *G06F 12/14*  (2006.01)
  *H04L 9/00*  (2006.01)
(52) U.S. Cl. ...................... 713/167; 713/193
(58) Field of Classification Search .......... 713/167, 713/193
  See application file for complete search history.

(56) References Cited

U.S. PATENT DOCUMENTS

| 4,817,140 | A | 3/1989 | Chandra et al. |
| 4,827,508 | A | 5/1989 | Shear |
| 4,908,861 | A | 3/1990 | Brachtl et al. |
| 4,969,189 | A | 11/1990 | Ohta et al. |
| 4,977,594 | A | 12/1990 | Shear |
| 5,007,082 | A | 4/1991 | Cummins |
| 5,023,907 | A | 6/1991 | Johnson et al. |
| 5,050,213 | A | 9/1991 | Shear |
| 5,140,634 | A | 8/1992 | Guillou et al. |
| 5,276,311 | A | 1/1994 | Hennige |
| 5,283,830 | A | 2/1994 | Hinsley et al. |
| 5,335,334 | A | 8/1994 | Takahashi et al. |
| 5,349,643 | A | 9/1994 | Cox |

(Continued)

FOREIGN PATENT DOCUMENTS

EP  0695985  2/1996

(Continued)

OTHER PUBLICATIONS

"Authentication and Delegation with Smart-cards", Abadi et al., Jul. 30, 1992, 30 pages.

(Continued)

*Primary Examiner*—Matthew Heneghan

(57) ABSTRACT

In accordance with certain aspects, data is received from a calling program. Ciphertext that includes the data is generated, using a symmetric cipher, in a manner that allows only one or more target programs to be able to obtain the data from the ciphertext. In accordance with other aspects, a bit string is received from a calling program. An identifier of the calling program is checked to determine whether the calling program is allowed to access data encrypted in ciphertext of the bit string. The integrity of the data is also verified, and the data is decrypted using a symmetric key. The data is returned to the calling program only if the calling program is allowed to access the data and if the integrity of the data is successfully verified.

17 Claims, 9 Drawing Sheets

U.S. PATENT DOCUMENTS

| | | | |
|---|---|---|---|
| 5,365,589 | A | 11/1994 | Gutowitz |
| 5,410,598 | A | 4/1995 | Shear |
| 5,421,006 | A | 5/1995 | Jablon et al. |
| 5,448,716 | A | 9/1995 | Hardell et al. |
| 5,473,690 | A | 12/1995 | Grimonprez et al. |
| 5,473,692 | A | 12/1995 | Davis |
| 5,483,649 | A | 1/1996 | Kuznetsov et al. |
| 5,491,827 | A | 2/1996 | Holtey |
| 5,530,758 | A | 6/1996 | Marino, Jr. et al. |
| 5,544,246 | A | 8/1996 | Mandelbaum et al. |
| 5,557,518 | A | 9/1996 | Rosen |
| 5,557,765 | A | 9/1996 | Lipner |
| 5,559,957 | A | 9/1996 | Balk |
| 5,615,263 | A | 3/1997 | Takahashi |
| 5,638,446 | A | 6/1997 | Rubin |
| 5,654,746 | A | 8/1997 | McMullan, Jr. et al. |
| 5,664,016 | A | 9/1997 | Preneel et al. |
| 5,671,280 | A | 9/1997 | Rosen |
| 5,721,781 | A | 2/1998 | Deo et al. |
| 5,724,425 | A | 3/1998 | Chang et al. |
| 5,724,527 | A | 3/1998 | Karnik et al. |
| 5,745,886 | A | 4/1998 | Rosen |
| 5,757,919 | A | 5/1998 | Herbert et al. |
| 5,778,069 | A | 7/1998 | Thomlinson et al. |
| 5,796,824 | A | 8/1998 | Hasebe et al. |
| 5,812,662 | A | 9/1998 | Hsu et al. |
| 5,841,869 | A | 11/1998 | Merkling et al. |
| 5,844,986 | A | 12/1998 | Davis |
| 5,870,467 | A | 2/1999 | Imai et al. |
| 5,872,847 | A | 2/1999 | Boyle et al. |
| 5,892,900 | A | 4/1999 | Ginter et al. |
| 5,892,902 | A | 4/1999 | Clark |
| 5,892,904 | A | 4/1999 | Atkinson et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,919,257 | A | 7/1999 | Trostle |
| 5,920,861 | A | 7/1999 | Hall et al. |
| 5,933,498 | A | 8/1999 | Schneck et al. |
| 5,937,063 | A | 8/1999 | Davis |
| 5,940,504 | A | 8/1999 | Griswold |
| 5,943,422 | A | 8/1999 | Van Wie et al. |
| 5,944,821 | A | 8/1999 | Angelo |
| 5,949,876 | A | 9/1999 | Ginter et al. |
| 5,953,502 | A | 9/1999 | Helbig, Sr. |
| 5,958,050 | A | 9/1999 | Griffin et al. |
| 5,963,980 | A | 10/1999 | Coulier et al. |
| 5,982,891 | A | 11/1999 | Ginter et al. |
| 5,991,399 | A | 11/1999 | Graunke et al. |
| 5,991,876 | A | 11/1999 | Johnson et al. |
| 6,006,332 | A | 12/1999 | Rabne et al. |
| 6,009,274 | A | 12/1999 | Fletcher et al. |
| 6,009,401 | A | 12/1999 | Horstmann |
| 6,026,166 | A | 2/2000 | LeBourgeois |
| 6,032,257 | A | 2/2000 | Olarig et al. |
| 6,092,189 | A | 7/2000 | Fisher et al. |
| 6,105,137 | A | 8/2000 | Graunke |
| 6,148,083 | A | 11/2000 | Fieres |
| 6,185,678 | B1 | 2/2001 | Arbaugh |
| 6,189,100 | B1 | 2/2001 | Barr |
| 6,189,103 | B1 | 2/2001 | Nevarez et al. |
| 6,230,285 | B1 | 5/2001 | Sadowsky et al. |
| 6,237,786 | B1 | 5/2001 | Ginter et al. |
| 6,327,660 | B1 | 12/2001 | Patel |
| 6,401,208 | B2 | 6/2002 | Davis et al. |
| 6,453,334 | B1 | 9/2002 | Vinson et al. |
| 6,557,104 | B2 | 4/2003 | Vu et al. |
| 6,735,696 | B1 | 5/2004 | Hannah |
| 7,017,188 | B1 | 3/2006 | Schmeidler et al. |
| 7,047,414 | B2 | 5/2006 | Wheeler et al. |
| 7,103,771 | B2* | 9/2006 | Grawrock ................ 713/155 |
| 7,188,240 | B1 | 3/2007 | Berstis et al. |
| 7,194,092 | B1 | 3/2007 | England et al. |
| 7,302,709 | B2 | 11/2007 | England |
| 2002/0007452 | A1 | 1/2002 | Traw et al. |
| 2002/0069365 | A1 | 6/2002 | Howard et al. |
| 2002/0107803 | A1 | 8/2002 | Lisanke et al. |
| 2002/0120936 | A1 | 8/2002 | Del Beccaro et al. |
| 2002/0152173 | A1 | 10/2002 | Rudd |
| 2003/0056112 | A1 | 3/2003 | Vinson et al. |
| 2003/0126454 | A1* | 7/2003 | Glew et al. ................ 713/193 |
| 2003/0163711 | A1* | 8/2003 | Grawrock ................ 713/189 |
| 2003/0188179 | A1 | 10/2003 | Challener et al. |
| 2004/0003273 | A1* | 1/2004 | Grawrock et al. ........... 713/193 |
| 2007/0067624 | A1 | 3/2007 | England |
| 2007/0086588 | A1 | 4/2007 | England |
| 2007/0088949 | A1 | 4/2007 | England |
| 2007/0104329 | A1 | 5/2007 | England |

FOREIGN PATENT DOCUMENTS

| | | |
|---|---|---|
| GB | 2260629 | 4/1993 |
| WO | WO9938070 | 7/1999 |

OTHER PUBLICATIONS

"A Secure and Reliable Bootstrap Architecture", Arbaugh et al., Distributed Systems Laboratory, Philadelphia, PA, 1997, pp. 65-71.

"Tamper-resistant software: An Implementation", Aucsmith, D., Lecture Notes in Computer Science, 1996, vol 1174, pp. 317-333.

"On the (Im)possibility of Obfuscating Programs", Barak et al., CRYPTO, 2001, LNCS 2139, pp. 1-18.

"Authenticated Encryption: Relations among notions and analysis of the generic composition paradigm", Bellare et al., Sep. 25, 2000, pp. 1-29.

"Keying Hash Functions for Message Authentication", Bellare et al., Advances in Cryptology-CRYPTO, 1996, LNCS 1109, pp. 1-15.

"Bits: A Smartcard Protected Protected Operating System", Clark et al. Communications of the ACM, vol. 37, No. 11, Nov. 1994, pp. 66-70, 94.

"Defending Systems Against Viruses through Cryptographic Authentication", Davida et al., IEEE Computer Society Symposium on Security and Privacy, May 1-3, 1989, pp. 312-318.

"Department of Defense Trusted Computer System Evaluation Criteria", Department of Defense Standard, Dec. 1985, pp. 1-79.

First Office Action from The Patent Office of the State Intellectual Property Office of the People's Republic of China in a counterpart foreign application, date of dispatch Nov. 4, 2005, including English translation, 11 pages.

"Handbook of Applied Cryptography", CRC Press Series on Discrete Mathematics and its applications, 1997, XP-002265828, pp. 33, 493, 509, 510, 546-552.

"Internet Security: SanDisk Products and New Microsoft Technology Provide Copy Protected Music for Internet Music Player Market. (Product Announcement)", Edge: Work Group Computing Report, Apr. 19, 1999, 2 pages.

"Personal Secure Booting", Itoi et al., ACISP 2001, LNCS 2119, pp. 130-144.

Kuhn, M., "The TrustNo 1 Cryptoprocessor Concept", Apr. 30, 1997, Purdue University, 3 pages.

"Authentication in Distributed Systems: Theory and Practice", Lampson et al., Digital Equipment Corporation, ACM Transactions on Computer Systems, vol. 10, No. 4, Nov. 1992, pp. 265-310.

"Protection", Lampson, B.W., in Proc. Fifth Princeton Symposium on Information Sciences and Systems, Princeton University, Mar. 1971, pp. 437-443, reprinted in Operating Systems Review, 8, Jan. 1, 1974, pp. 18-24.

"Preventing Piracy: Authorization Software May Ease Hollywood's Fear of the Net", Internet World Magazine, Apr. 1, 2000, 3 pages.

"Phoenix Technologies Partners with Secure Computing in Enterprise Security Marketplace", Jul. 12, 2001, Business Wire, Courtesy of Dialog Text Search, p. 1-2.

"Applied Cryptography", Schneier, B., Applied Cryptography, Protocols, Algorithms, and Source Code in C, 1996, pp. 574-577.

"Building a high-performance, programmable secure coprocessor", Smith et al., Computer Networks, vol. 31, No. 8, Apr. 1999, pp. 831-860.

"Trusting Trusted Hardware: Towards a Formal Model for Programmable Secure Coprocessors", Smith set al., Third USENIX Workshop on Electronic Commerce, 1998, pp. 83-98.

"Using a High-performance, Programmable Secure Coprocessor", Smith et al., FC'98, LNCS 1465, 1998, pp. 73-89.

Stallings, "Cryptography and Network Security: Principles and Practice", Prentice-Hall, Inc., Publishers, 1999.

"AEGIS: Architecture for Tamper-Evident and Tamper-Resistant Processing", Suh et al., MIT Laboratory for Computer Science, XP-002265826, 2003, pp. 1-16.

"TCPA main specification version 1.1a", Sep. 1, 2001, website: http//www.trustedpc.org, Trusted Computing Platform Alliance, 332 pages.

"Using Secure Coprocessors", Yee, School of Computer Science, Carnegie Mellon University, 1994, 104 pages.

"Facing an Internet Security Minefield, Microsoft Hardens NT Server Defenses", Young, R., Windows Watcher, Sep. 12, 1997, vol. 7, Issue 9, p. 1, 6p, 1 chart.

"Non-Final Office Action", U.S. Appl. No. 10/431,011, filed Jun. 1, 2007.

""Non-Final Office Action" U.S. Appl. No. 10/431,011, filed Nov. 27, 2006", 1-14.

""Final Office Action", U.S. Appl. No. 10/406,861, filed Aug. 17, 2007", 1-13.

""Non-Final Office Action", U.S. Appl. No. 10/406,861, filed Jan. 10, 2007", 1-26.

""Restriction Requirement", U.S. Appl. No. 10/406,861, filed Sep. 12, 2006", 1-37.

""Non-Final Office Action", U.S. Appl. No. 10/431,011, filed Jun. 30, 2006", 1-35.

""Final Office Action", U.S. Appl. No. 10/407,117, filed Jul. 12, 2007", 1-18.

""Non-Final Office Action", U.S. Appl. No. 10/407,117, filed Dec. 11, 2006", 1-16.

""Restriction Requirement", U.S. Appl. No. 10/407,117, filed Sep. 14, 2006", 1-4.

""Final Office Action", U.S. Appl. No. 10/430,994, filed Jul. 10, 2007", 1-21.

""Non-Final Office Action", U.S. Appl. No. 10/430,994, filed Jun. 16, 2005", 1-6.

""Non Final Office Action", U.S. Appl. No. 10/430,994, filed Jan. 24, 2007", 1-19.

""Non-Final Office Action", U.S. Appl. No. 10/430,994, filed Aug. 9, 2006", 1-17.

""Non-Final Office Action", U.S. Appl. No. 10/430,994, filed Dec. 14, 2005", 1-6.

Coffey, et al., "Non-repudiation with mandatory proof of reciept", ACM, vol. 26,(1996),6-17.

Housley, R "Internet X.509 Public Key Infrastructure Certificate and CRL Profile", 1-3, Jan. 1999.

""Non-Final Office Action", U.S. Appl. No. 10/431,011, filed Jun. 1, 2007,", 1-6.

Arbaugh, William et al., "Automated Recovery in a Secure Bootstrap Process", *Network and Distributed System Security Symposium, Internet Society*, Mar. 1998, 155-167.

Muller-Schloer, Christian "A Microprocessor-based Cryptoprocessor", vol. 3 Issue 5, Oct. 31, 1983,5-15.

* cited by examiner

300

320

SAVING AND RETRIEVING DATA BASED ON SYMMETRIC KEY ENCRYPTION

RELATED APPLICATIONS

This application is a divisional of U.S. patent application Ser. No. 10/406,861, filed Apr. 4, 2003, entitled "Saving and Retrieving Data Based on Symmetric Key Encryption", which is hereby incorporated by reference herein, and which claims the benefit of U.S. Provisional Application No. 60/373,505, filed Apr. 17, 2002, entitled "Secure Store Processor", to Paul England, Marcus Peinado, and Bryan M. Willman, which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to saving and retrieving data, and particularly to saving and retrieving data based on symmetric key encryption.

BACKGROUND

Protecting data on computers so that the data is only disclosed to appropriate parties has become an important concern for users. The types of data that users want to protect varies greatly, such as work-related or personal confidential documents, bank account numbers, credit card numbers, social security numbers, and so forth. Additionally, it is also important to some third parties to protect the data on the users' computers from improper use or access. For example, credit card issuers want credit card numbers to be protected so that they are not disclosed to malicious programs or parties hacking into the computer, music companies want songs to be protected so they cannot be copied, movie studios want movies to be protected so they cannot be copies, and so forth.

One solution to protect data on computers is to do away with general-purpose computing devices and use special-purpose tamper-resistant boxes for delivery, storage, and display of secure content. This solution, however, can be undesirable as it prevents users from expanding their computers (e.g., users cannot install additional software components and/or hardware components on such tamper-resistant boxes). Thus, it would be beneficial to provide a way to allow data to be protected on general-purpose computing devices.

SUMMARY

Saving and retrieving data based on symmetric key encryption is described herein.

In accordance with one aspect, data is received from a calling program. Ciphertext that includes the data is generated, using a symmetric cipher, in a manner that allows only one or more target programs to be able to obtain the data from the ciphertext.

In accordance with another aspect, a bit string is received from a calling program. An identifier of the calling program is checked to determine whether the calling program is allowed to access data encrypted in ciphertext of the bit string. The integrity of the data is also verified, and the data is decrypted using a symmetric key. The data is returned to the calling program only if the calling program is allowed to access the data and if the integrity of the data is successfully verified.

BRIEF DESCRIPTION OF THE DRAWINGS

The same numbers are used throughout the document to reference like components and/or features.

DETAILED DESCRIPTION

Figure 1:
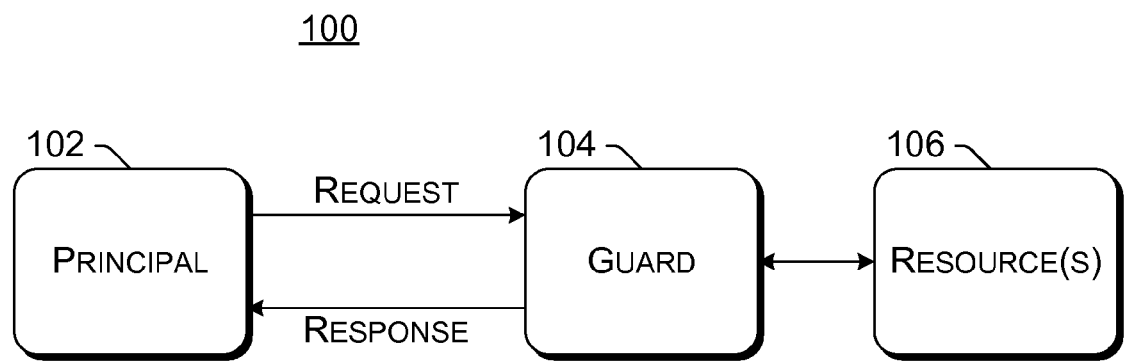
FIG. 1 illustrates an exemplary access control model.

FIG. 1 illustrates an exemplary access control model 100. A principal 102 can make a request to access a protected resource. The request is received by a guard 104, which is a component that controls access to a resource 106. Guard 104 examines the request and decides whether to grant the request based on an access policy for the resource as well as other information, such as the identity of the principal 102 that issued the request. For ease of explanation, a single principal 102, guard 104, and resource 106 are illustrated in FIG. 1. However, it should be noted that access control model 100 can include multiple principals 102, multiple guards 104, and/or multiple resources 106.

A principal 102 refers to a component or module that requests access to protected data. This request may be a request to retrieve the protected data (e.g., a request for retrieval of a cryptographic key), or a request to perform an operation(s) using the protected data (e.g., the protected data could be a cryptographic key and the request could be a request to encrypt or decrypt particular data using the cryptographic key). The principal 102 can be implemented as a component or module in hardware, software, firmware, or a combination of hardware, software, and/or firmware.

A guard 104 refers to a component or module that controls access to the protected data. Guard 104 uses an access policy associated with the protected data, as well as other information (such as the identity of the principal requesting access to the protected content), to determine whether to allow the principal to access the protected data. If guard 104 determines that the requesting principal is permitted to access the protected data, then guard 104 responds to the request in an appropriate manner (e.g., if the request is a request for the protected data, then the protected data is returned to the principal; or, if the request is a request for particular data to be encrypted using the protected data, then guard 104 encrypts the particular data using the protected data and returns the ciphertext (the encrypted data) to the principal). It should be noted that guard 104 may restrict principals based on the nature of the request. For example, guard 104 may allow a particular principal to have particular data signed using the protected data but may not allow the protected data to be returned to the particular principal.

A guard 104 can also be characterized as a disclosure guard and/or a service guard. A service guard performs certain operations (e.g., encryption, decryption, digital signing, etc.) with the protected data (e.g., a cryptographic key) at the request of principals without disclosing the protected data. A disclosure guard, on the other hand, reveals the protected data to authorized requestors. It should be noted that a particular guard 104 can be both a disclosure guard and a service guard.

Resource 106 can be any type of data to which access is to be restricted. Examples of resources 106 include cryptographic keys, bank account numbers, credit card numbers, personal information such as social security numbers, passwords, and so forth. Resource 106 can also be virtually anything else in a computing device. For example, a resource 106 may also be physical memory (e.g., RAM or ROM), optical or magnetic disks or disk drives, video cards, sound cards, smart cards, and so forth. By way of another example, a resource 106 may also be operating system abstractions, such as processes, files, threads, semaphores, and so forth.

In the discussion herein, access control model 100 is described predominately with reference to being implemented on a single computing device. However, it is to be appreciated that different portions of the model can be implemented on different computing devices. For example, a principal 102 may be on one computing device while a guard 104 and resource 106 may be on another computing device.

Figure 2:
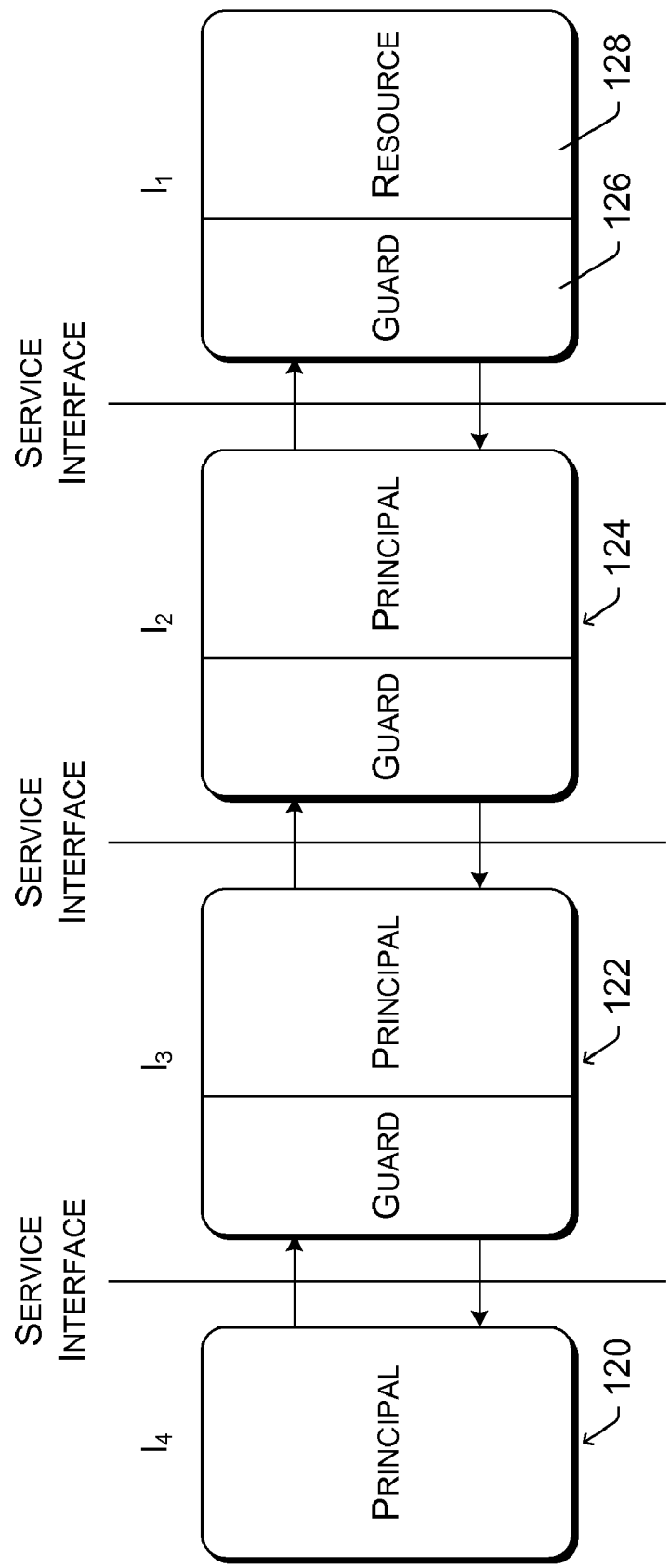
FIG. 2 shows an example access control environment employing four different hierarchical layers.

The principals and guards on a computing device can be categorized into any number n of hierarchical layers $1_n$. FIG. 2 shows an example access control environment employing four different hierarchical layers. In one implementation, layer $1_1$ refers to a hardware or security kernel layer, layer $1_2$ refers to a basic input/output system (BIOS) layer, layer $1_3$ refers to an operating system (OS) layer, and layer $1_4$ refers to an application layer.

In the example environment of FIG. 2, the lowest layer (layer $1_1$) guards a root resource. Programs in the intermediate layers (layers $1_2$ and $1_3$) act as principals that request access from the next lower layer, while at the same time act as guards towards principals in the next higher layer. The intermediate layers can thus add functionality for principals in higher layers.

By way of example, assume that a program 120 desires to retrieve a root resource 128 that is guarded by guard 126. Program 120 acts as a principal requesting access to the root resource 128 from module 122, which acts as a guard of the resource. If module 122 has a copy of the resource 128 (e.g., previously obtained from guard 126 in response to a previous request for the resource by program 120 or some other program in layer 14, or when module 122 was initialized and loaded in the computing device), then module 122 checks whether program 120 is allowed to retrieve the resource. Module 122 then returns the resource to program 120 if program 120 is allowed to retrieve the resource.

However, if module 122 does not have a copy of the resource 128, then module 122 acts as a principal requesting access to the root resource from module 124, which acts as a guard of the resource. If module 124 has a copy of the resource 128 (e.g., previously obtained from guard 126 in response to a previous request for the resource by module 122 or some other module in layer $1_3$, or when module 124 was initialized and loaded in the computing device), then module 124 checks whether module 122 is allowed to retrieve the resource. Module 124 then returns the resource to module 122 if module 122 is allowed to retrieve the resource. Module 122 then returns the resource to program 120 if program 120 is allowed to retrieve the resource.

However, if module 124 does not have a copy of the resource 128, then module 124 acts as a principal requesting access to the root resource from guard 126. Guard 126 checks whether module 124 is allowed to retrieve the resource, and returns the resource to module 124 if module 124 is allowed to retrieve the resource. Module 124 then returns the resource to module 122 if module 122 is allowed to retrieve the resource, and module 122 returns the resource to program 120 if program 120 is allowed to retrieve the resource.

In the discussion herein, multiple references are made to employing access control model 100 of FIG. 1 to allow authenticated operation of software. Typically, the resources being protected in authenticated operation of software are cryptographic keys. However, it is to be appreciated that authenticated operation of software is only one example of the use of access control model 100.

Another example of the use of access control model 100 is the authentication of a user(s) to a computer. Most modern computers have an access control system. A user logs on to the computer so that the computer knows who the user is. After logging on, the user runs programs that typically need to access system resources (e.g. read files, write to windows on the screen, etc.). Typically, the access control system of the computer is consulted (e.g., "can user x perform operation y on resource z?"). If the answer is "no" the program cannot access the resource.

Another example of the use of access control model 100 is the authentication of a user(s) to a remote service. Remote services such as web sites (e.g., on-line brokers or banks) can be thought of as having access control systems. The resources are people's bank accounts, their money and their stocks. After a user logs on to the web site, the access control system will determine if the user is authorized to perform the accesses requested by the user, such as a "read" access on the resource "bank account data" (to retrieve the latest bank statement), or a "transfer" access on the resource "$1000 in bank account 12345".

Yet another example of the use of access control model 100 is restricting physical access to particular buildings or areas. For example, when a user arrives at work in the morning, the user shows his or her badge and requests the "open" operation on the resource "front door". Some electronic system (a guard) determines, based on information stored on the badge, if the user is allowed to enter the building and unlocks the door accordingly.

A computing device enables authenticated operation of a program (software) if it is possible to let the program obtain protected access (from a disclosure guard or from a service guard) to at least one cryptographic resource. In certain embodiments, a computing device that enables authentication and isolation, as described below, enables authenticated operation.

A program C can be referred to as being isolated from another program D if two points are satisfied: (1) there is memory that can be accessed by program C but not by program D, and (2) program D cannot initiate execution of program C (except, possibly, at an entry point(s) determined by program C). A program is given by its transition rules (executable code) and by its initial state (entry point(s) or initial value of the instruction pointer IP). The first point guarantees integrity of the program code and the state information of program C, even in the presence of adversarial behavior by program D, since data can be stored in the memory that cannot be accessed by program D. This point also allows program C to protect confidential data (e.g., cryptographic keys) from observation by program D. The second point guarantees that D cannot subvert the behavior of C by choosing the entry point adversarially.

Additionally, it can be said that a program C can authenticate a program D if program C is able to identify both the transition rules (program code) and the initial state of program D. The computing device enables isolation for any program C from any other program D, with the exception of a single program $E_j$ for each layer j<i, where i is the layer of program C. This protects programs from observation and interference by any program, except for the sequence $E_1$, $E_2, \ldots, E_{i-1}$ of guards through which program C requests access to its resources. Furthermore, for any layer i, the computing device enables a program executing in layer i to authenticate at least some programs in layer i+1. This requirement allows a program to act as a guard for requests from principals in the next layer. These two observations give rise to an inductive argument that programs in any layer can act as guards for resources by requesting access to a resource from their predecessor, protecting their integrity and the resource through isolation and authenticating requests from principals in the next layer.

Isolation can be implemented by using physical memory protections. This approach is referred to as "isolation in space" or "space isolation". For example, the ring and virtual memory protections found in many modern microprocessors are sufficient to implement isolation in space. An operating system kernel (layer i) running in privileged mode can set up page tables for applications (layer i+1), such that any application can only access those parts of physical memory that the operating system kernel chooses to map into the application's virtual address space. Furthermore, the kernel restricts applications' privileges so that they cannot change the memory mapping, and ensures that applications can initiate execution of kernel code only at a well defined entry point(s) (system calls).

Another approach to implementing isolation between two layers is to separate their execution in time. This approach is referred to as "isolation in time" or "time isolation". A program in a first layer i executes to completion, makes certain resources unavailable, and then terminates. Subsequently, control is transferred to the next layer i+1.

Authentication occurs between subsequent layers (j=i+1). Program C authenticates the program (transition rules) and the initial state of the configuration of j. The program can be authenticated by letting program C inspect the program in layer j. That is, typically program C reads the memory, which contains the program for layer j, and computes a cryptographic digest over this memory range. It should be noted that the goal at this point is only to ascertain the identity of the code, not to evaluate statements made by other principals about the code. Thus, certificates are not necessary at this point.

The second task for program C is to identify the initial state of program D. In general, the problem of determining the initial state of a program at an arbitrary execution stage is very difficult. Thus, program C controls the initial state of program D. In practical terms, this means that program C can only ascertain the initial state σ of program D if program C initiates the execution of program D at σ.

In summary, in order to authenticate program D, program C inspects the memory contents it deems relevant (program and, possibly, data) and computes a cryptographic digest. After that, program C transfers execution to a well-defined entry point of program D.

In situations where the resources are cryptographic keys, authenticated operation allows each operating system and application program to have exclusive access to one or more secrets. The isolation discussed above protects each secret from attacks by adversarial code. The authentication of programs discussed above allows programs to be identified, such that each secret is disclosed only to the program that owns it.

Generally, given a request from a program (a principal 102 of FIG. 1), a guard 104 establishes the identity of the program (that is, guard 104 authenticates the program). If the program is not the owner of the requested secret (a resource 106), then guard 104 rejects the request. Otherwise, guard 104 computes some function of the secret (which may be the secret itself) and, possibly, further information provided by the program and returns the result. Alternatively, rather than explicitly accepting or rejecting requests, guard 104 may service the request but bind the identity of the caller into the result. This alternate approach is appropriate, for example, if the result returned by the guard does not contain confidential information (e.g., requests to use a secret to produce a digital signature). The term gating functions is used herein to refer to both of these cases.

Additionally, in either case, guard 104 authenticates the caller (principal 102). Authenticating a principal 102 is also referred to herein by a function ID( ), which returns a digest of the calling program (the program calling a gating function of guard 104). The digest can be generated in any of a wide variety of conventional manners, such as using any one or more of a variety of cryptographic hash functions (also referred to as one-way hash functions), such as SHA1 (Secure Hash Algorithm 1), MD5 (Message Digest 5), MD2 (Message Digest 2), etc.; using a keyed MAC (Message Authentication Code); and so forth.

One class of gating functions described herein implement sealed storage. The purpose of sealed storage is to allow programs to store secrets, such that only a particular set of one or more programs (defined by the program that stores the secret) can retrieve the secrets. In one implementation, only the program that originally saves (seals) the secret can recover (unseal) the secret. Typically, the life time of these secrets will exceed the time of individual executions of the program. Secrets used during a single execution of a program can be saved (sealed), or alternatively isolation and a random number generator also allow a program to maintain secrets during a single execution. Sealed storage also allows a program to maintain secrets across different executions, which may not overlap in time. A layer $l_i$ exposes sealed storage to the next layer $l_{i+1}$ by means of the following interface (e.g., using the "Seal" and "UnSeal" operations and/or PKSeal and PKUnseal operations).

The discussions herein regarding sealed storage refer to cryptographic keys being used to encrypt and decrypt data. These cryptographic keys are the keys associated with the guard that is guarding access to the resource (e.g., guard 104 of FIG. 1).

The discussions herein also refer to identifiers of programs (e.g., an identifier of the program calling or invoking an operation, or an identifier of a target program that is allowed to access a resource). These identifiers are often referred to herein as digests. However, it is to be appreciated that digests are only one example of identifiers of programs. Other types of identifiers that are a measure or other representation of the program and that allow any changes to the program to be detected can be used. If any changes are made to the program (e.g., one or more instructions being changed by an adversary in an attempt to maliciously gain access to and make use of the protected data) then the identifier of the program should reflect that change (e.g., the identifier for the unchanged program will be different than the identifier for the changed program).

The Seal operation receives, as an input, data (e.g., a secret) to be sealed. The Seal operation also optionally receives, as an input, a condition that identifies when and/or to whom the secret may be revealed (unsealed). In one implementation, this condition is a digest of a target program that is allowed to retrieve (unseal) the data. Alternatively, programs that are to be allowed to retrieve (unseal) the data can be identified in other manners. For example, the programs may be identified by a public key that verifies one or more certificates, with each certificate being associated with one or more of the programs.

Alternatively, other conditions may be used in addition to, or in place of, an identifier of a target program. For example, the condition may include particular time constraints for when the data can be revealed (unsealed), such as particular times of the day or days of the week during which the secret can be revealed (unsealed). By way of another example, the condition may include an identifier of a password or other data that must be provided in order for the secret to be revealed (unsealed)—e.g., the secret can only be unsealed by programs having knowledge of the password.

By way of yet another example, the condition can be a logical formula (e.g., any statement written in first order logic, any statement written in predicate logic, etc.). The logical formula is evaluated (e.g., by the guard) and the secret is revealed (unsealed) only if the evaluation returns an indication of true.

In still another example, the condition can be an executable program in some language (e.g., Java, C*, Javascript, VBScript, etc.). The program is executed (e.g., by the guard) and the secret is revealed (unsealed) only if the program returns some indication of "true" or "satisfied".

In situations where the condition is the digest of the target program, rather than being supplied with the digest of the target program, the Seal operation may use the digest of the program that invokes the Seal operation (thereby implicitly inputting the digest of the target program). Additionally, digests of multiple target programs can be input to the Seal operation, thereby allowing multiple target programs to retrieve (unseal) the data.

The Seal operation encrypts its inputs (the data and the condition(s) allowing retrieval (unsealing) of the data) together with an identifier of the caller. The Seal operation returns the input data in an encrypted form (as ciphertext). The Seal operation also returns a value (e.g., a message authentication code (MAC) value) that can be used to verify the integrity of the sealed data. This returned data allows the stored data to be referenced in subsequent UnSeal operations, as discussed in more detail below.

Pseudo code for the Seal operation is illustrated in Table I. In the pseudo code of Table I, ID( ) refers to the ID( ) function discussed above, e refers to the value (e.g., a string or sequence of bits) that is returned to the caller, data refers to the data to be sealed, and $[t_1, \ldots, t_m]$ refers to the digests of one or more (m) target program(s) that are allowed to retrieve (unseal) the data (or alternatively one or more other conditions).

TABLE I d = ID( )
e = store (data, $[t_1, \ldots, t_m]$, d)
return e

Figure 3:
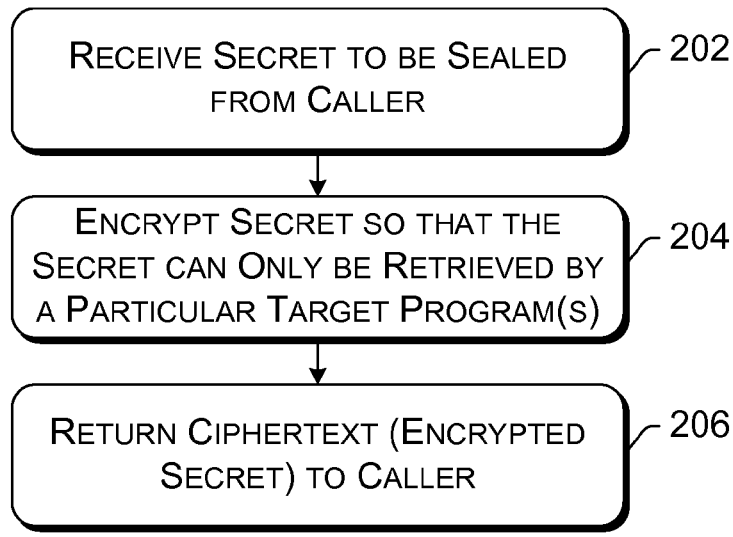
FIG. 3 is a flowchart illustrating an exemplary process for implementing the Seal operation.

FIG. 3 is a flowchart illustrating an exemplary process 200 for implementing the Seal operation. Process 200 is performed by a guard 104 of FIG. 1, and may be implemented in hardware, software, firmware, or a combination thereof.

Initially, a secret to be sealed is received from the caller (act 202). The secret is encrypted so that the secret can only be retrieved by a particular target program(s) (act 204), or alternatively so that the secret can only be retrieved if one or more particular conditions are satisfied. Ciphertext including the encrypted secret is then returned to the caller (act 206). Additional information may also be returned to the caller (as part of the ciphertext or separate from the ciphertext), such as a digest of the caller and/or digest(s) of the target program(s).

The UnSeal operation receives, as an input, a bit string that was returned by the Seal operation when sealing data (e.g., a cryptographic key) that the calling program now desires to retrieve. The UnSeal operation obtains the condition(s) for revealing the data and checks whether those conditions are satisfied. For example, if the condition(s) included digest(s) of the one or more target program(s) that are allowed to retrieve (unseal) the data, then the UnSeal operation obtains those digest(s) and checks whether the calling program is one of the one or more target program(s). If the calling program is not one of the one or more target program(s) then the UnSeal operation fails and the requested data is not returned to the caller. However, if the calling program is one of the one or more target program(s), then the UnSeal operation succeeds and the requested data is returned to the calling program. The digest of the program that sealed the data is also optionally returned by the UnSeal operation.

Pseudo code for the UnSeal operation is illustrated in Table II. In the pseudo code of Table II, data refers to the data that is being requested (and that has been previously sealed), $[t_1, \ldots, t_m]$ refers to the digests of one or more (m) target program(s) that are allowed to retrieve (unseal) the data (or alternatively one or more other conditions), e refers to the input to the UnSeal operation (typically previously output by a Seal operation), and d refers to the digest of the program that sealed the data.

Figure 4:
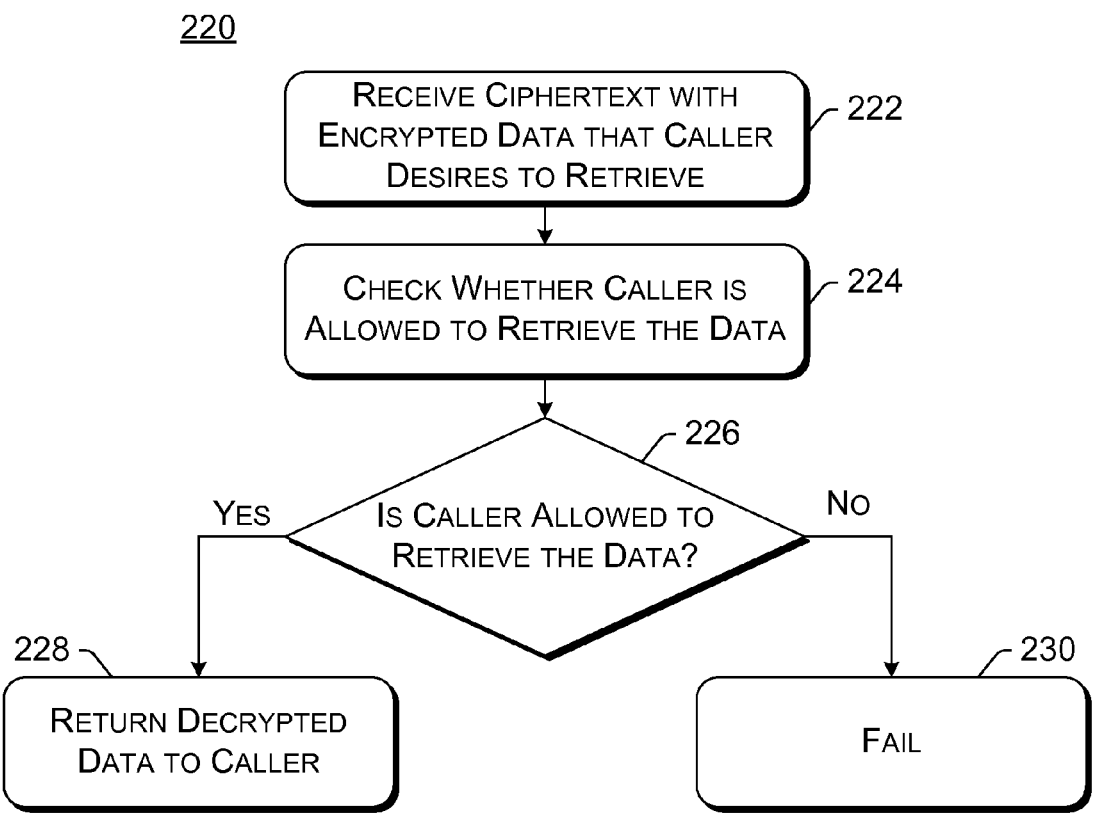
FIG. 4 is a flowchart illustrating an exemplary process for implementing the UnSeal operation.

TABLE II (data, $[t_1, \ldots, t_m]$, d) = retrieve(e)
if ID( ) is in $[t_1, \ldots, t_m]$ then return (data, d)
    else fail FIG. 4 is a flowchart illustrating an exemplary process 220 for implementing the UnSeal operation. Process 220 is performed by a guard 104 of FIG. 1, and may be implemented in hardware, software, firmware, or a combination thereof.

Initially, ciphertext with encrypted data that the caller desires to retrieve is received (act 222). A check is made as to whether the caller is allowed to retrieve the data (act 224), and processing proceeds based on whether the caller is allowed to retrieve the data (act 226). If the caller is allowed to retrieve the data, then the data (decrypted) is returned to the caller (act 228). If the caller is not allowed to retrieve the data, then the process fails (act 230) and the data is not returned to the caller.

Sealed storage can be implemented in different manners. In one implementation, sealed storage is implemented using physically protected non-volatile memory. In this implementation, the computing device associates different guards with different portions of the protected non-volatile memory and allows each guard to access only those portions which are associated with that guard. In this implementation, the Store and Retrieve operations referenced in the Seal and UnSeal operations are invoked to have the computing device store and retrieve, respectively, the data in the protected non-volatile memory associated with the guard.

By way of example, a storage device (such as a hard disk drive) can implement a guard. Rather than simply executing read and write commands to the storage device unconditionally, the storage device identifies the principal attempting to access the storage device (e.g., based on a digest of the principal) and allows only a particular principal(s) to access the storage device. Alternatively, different principals may be restricted to accessing only particular portions of the storage device (e.g., particular sectors or address ranges).

In another implementation, sealed storage is implemented using cryptography. A description of one exemplary implementation of sealed storage using cryptography follows.

When using cryptography to implement sealed storage, the resource is a key K rather than physically protected memory. The Store operation does not physically store its inputs. Rather, the Store operation produces a cryptographically protected output c, which is the inputs of the Store operation in an encrypted and integrity protected form. The encryption is a result of applying a symmetric cipher to the input(s). The latter property results from applying a message authentication code (MAC) to the input(s) (either before or after the input(s) is encrypted).

Pseudo code for the Store operation is illustrated in Table III. In the pseudo code of Table III, b refers to the bit string input to the Store operation, c refers to the bit string output by the Store operation, K1 refers to a first part of the key K, and K2 refers to a second part of the key K. The key K is a symmetric key of the guard implementing the Seal and Store operations.

TABLE III $m = MAC_{K1}(b)$
$c = (m, Encrypt_{K2}(b))$
return c

Thus, as can be seen in Table III, a value (m) is generated by applying a MAC to the bit string input to the Store operation. The MAC is keyed to a portion (K1) of the key K. The bit string input to the store operation is also encrypted using a second portion (K2) of the key K. The values generated by applying the MAC to the input bit string and by encrypting the input bit string are then returned to the caller of the Store operation.

The key K is partitioned into two independent keys K1 and K2 in order to avoid using the same key for the MAC and the cipher. This partitioning can be performed in any of a variety of manners. The partitions may use different bits of the key K or alternatively may use one or more of the same bits. For example, assuming that the key K is 1024 bits, then the low 512 bits may be used as key K1 and the high 512 bits may be used as key K2, the even numbered bits (bits 0, 2, 4, 6, 8, 10, . . . , 1022) may be used as key K1 and the odd numbered bits (bits 1, 3, 5, 7, 9, 11, . . . , 1023) may be used as key K2, the low 650 bits may be used as key K1 and the high 650 bits may be used as key K2 (resulting in some bits being used for both K1 and K2), and so forth. Alternatively, the same key K may be used for both the MAC and the cipher.

The pseudo code illustrated in Table III implements the Store operation by computing a MAC over the data, encrypting the data, and outputting both the MAC and the ciphertext. Alternatively, the Store operation may be implemented in different manners. For example, the Store operation may encrypt the data first, then compute a MAC over the ciphertext and output both the ciphertext and the MAC. By way of another example, the Store operation may compute a MAC over the data, then encrypt both the data and the MAC, and output the ciphertext.

The encryption performed by the cipher of the Store operation can be performed using any of a variety of symmetric encryption algorithms. Generally, symmetric encryption algorithms use the same key for both encryption and decryption. Examples of such algorithms include triple-DES (Data Encryption Standard), AES (Advanced Encryption Standard), and so forth.

Similarly, the MAC can be any of a variety of message authentication codes, such as the MAC described in M. Bellare, R. Canetti, and H. Krawczyk, "Keying hash functions for message authentication," in Advances in Cryptology—Crypto'96, number 1109 in Lecture Notes in CS, 1996. Alternatively, integrity can be protected by means of a public key digital signature in place of a MAC.

Figure 5:
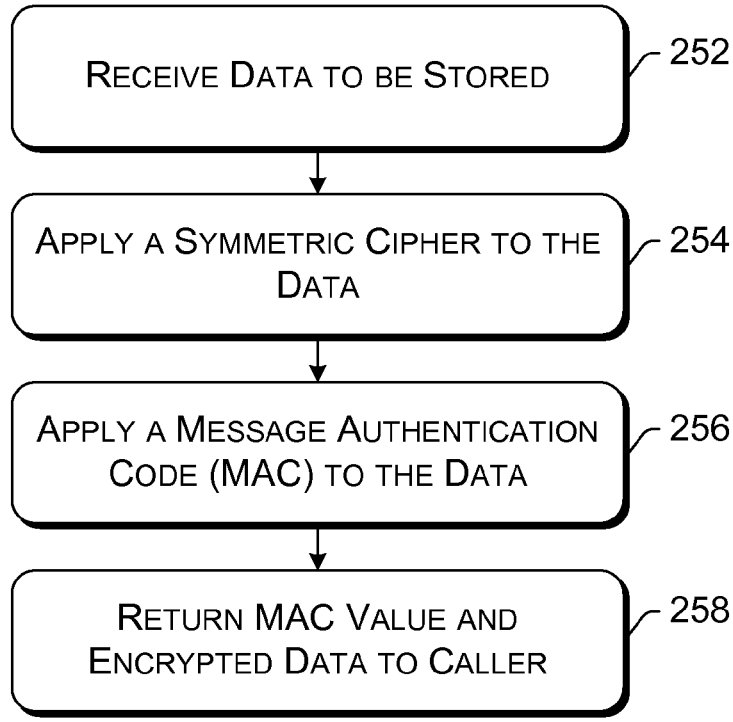
FIG. 5 is a flowchart illustrating an exemplary process for implementing the Store operation.

FIG. 5 is a flowchart illustrating an exemplary process 250 for implementing the Store operation. Process 250 is performed by a guard 104 of FIG. 1, and may be implemented in hardware, software, firmware, or a combination thereof.

Initially, data to be stored is received (act 252). A symmetric cipher is applied to the data (act 254) and a message authentication code (MAC) is applied to the data (act 256). The encrypted data generated in act 254 and the MAC value generated in act 256 are then returned to the caller (act 258).

The Retrieve operation receives an input bit string that includes a MAC value and ciphertext. The ciphertext is decrypted to generate plaintext and a MAC value is generated for the plaintext. If the MAC value generated for the plaintext is the same as the MAC value received as part of the input bit string, then the plaintext is returned to the caller. However, if the MAC value generated for the plaintext is not the same as the MAC value received as part of the input bit string, then the Retrieve operation fails and the plaintext is not returned to the caller. It is to be appreciated that the specific manner in which the Retrieve operation is implemented to obtain the MAC and the ciphertext from the input bit string is dependent on the manner in which the Store operation is implemented.

Pseudo code for the Retrieve operation is illustrated in Table IV. In the pseudo code of Table IV, c refers to the bit string input to the Retrieve operation, b refers to the bit string output by the Retrieve operation, m refers to the MAC value portion of the bit string input to the Retrieve operation, d refers to the ciphertext portion of the bit string input to the Retrieve operation, K1 refers to a first part of the key K, and K2 refers to a second part of the key K. The K1 and K2 keys are the same portions of the key K as discussed above with respect to the Store operation.

TABLE IV

Let (m, d) = c
$b = Decrypt_{K2}(d)$
if $m = MAC_{K1}(b)$ then return b
else fail Thus, as can be seen in Table IV, a value (b) is generated by decrypting the bit string input to the Retrieve operation. A MAC value is then generated for the value (b). If the MAC value generated by the Retrieve operation is the same as the MAC value that is received as part of the bit string input to the Retrieve operation then the value (b) is returned to the caller of the Retrieve operation, otherwise the Retrieve operation fails.

The pseudo code of Table IV is based on the implementation of the Store operation where the MAC is computed over the data, the data is encrypted, and the MAC and ciphertext together are output (and serve as the input bit string to the Retrieve operation). If the Store operation were implemented to encrypt the data first, then compute a MAC over the ciphertext and output both the ciphertext and the MAC, then the Retrieve operation would be implemented to compute the MAC of the ciphertext and compare it to the MAC value received as part of the input bit string, then decrypt the ciphertext and return the decrypted data if the MAC values match. If the Store operation were implemented to compute a MAC over the data then encrypt both the data and the MAC, then the Retrieve operation would be implemented to decrypt the input bit string, then compute a MAC over the data in the input bit string and compare the computed MAC to a MAC value in the decrypted string, and return the data if the MAC values match.

Analogous to the discussion above regarding the Store operation, any of a variety of decryption algorithms can be used by the Retrieve operation. However, the decryption algorithm should correspond to the encryption algorithm so that the encrypted data can be decrypted. Similarly, any of a variety of message authentication codes can be used as the MAC, but he message authentication code used should be the same as the message authentication code used by the Store operation.

Figure 6:
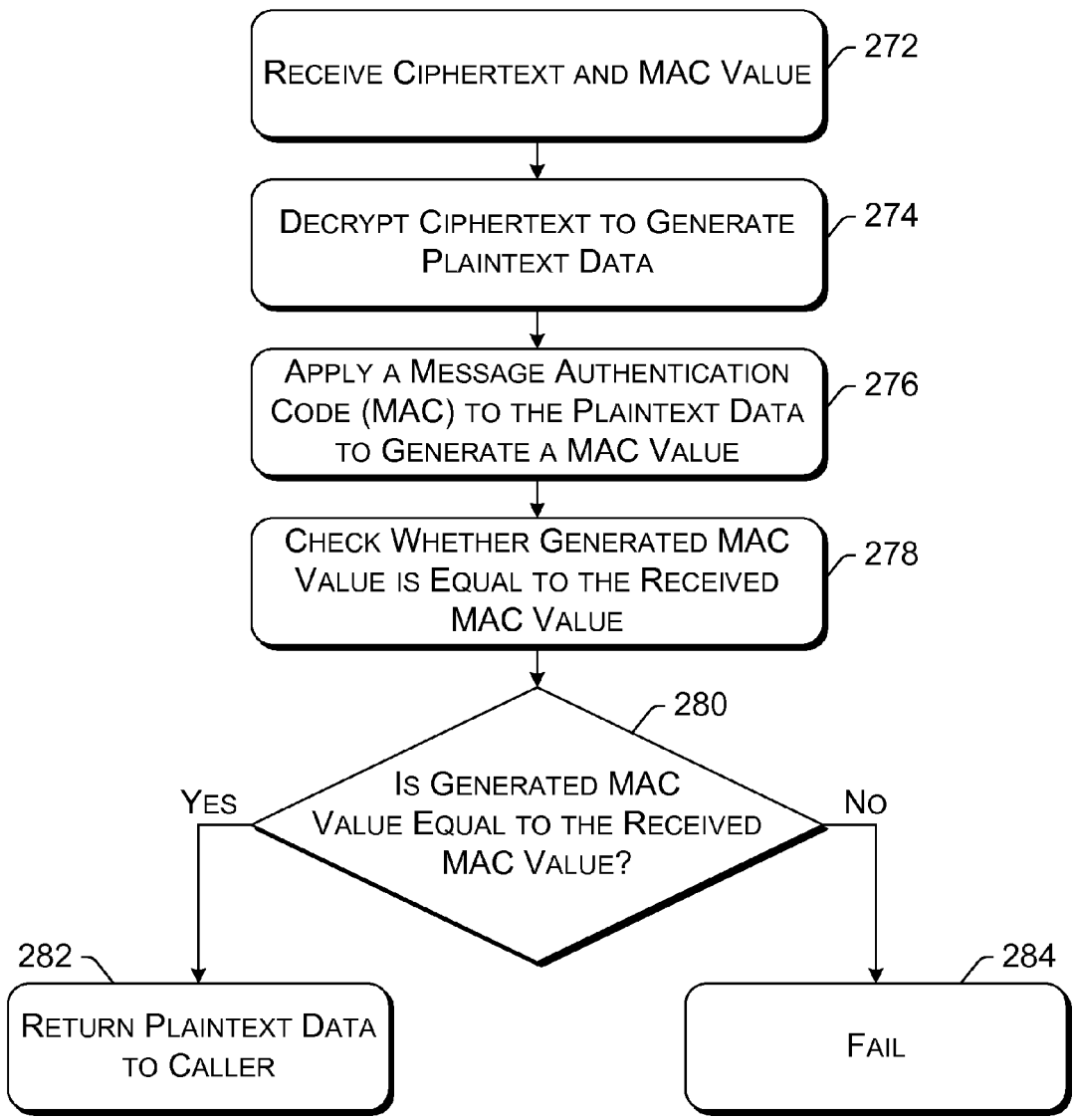
FIG. 6 is a flowchart illustrating an exemplary process for implementing the Seal operation.

FIG. 6 is a flowchart illustrating an exemplary process 270 for implementing the Seal operation. Process 270 is performed by a guard 104 of FIG. 1, and may be implemented in hardware, software, firmware, or a combination thereof.

Initially, a ciphertext and MAC value are received (act 272). The ciphertext is decrypted to generate plaintext data (act 274). A message authentication code (MAC) is applied to the plaintext data to generate a MAC value (act 276) and a check is made as to whether the MAC value generated in act 276 is equal to the MAC value received in act 272 (act 278). Processing then proceeds based on whether the generated MAC value is equal to the received MAC value (act 280). If the generated MAC value is equal to the received MAC value, then the plaintext data is returned to the caller (act 282). However, if the generated MAC value is not equal to the received MAC value, then the process fails (act 284) and the plaintext data is not returned to the caller.

Thus, the cryptography approach to sealed storage substantially guarantees that any corruption of the value c (the output of the Store operation) can be detected, and that the value b (the input to the Store operation) cannot be retrieved without access to the key K2 (the key used by the cipher to encrypt the value b).

Another class of gating functions implement remote authentication. The purpose of remote authentication is to allow programs to be authenticated even in the absence of a strong physical coupling to the authenticator (e.g., using servers or smart cards). In this situation, authentication is based on cryptography. That is, both entities go through a cryptographic authentication protocol. This involves the authenticated configuration having access to a secret, which, depending on the protocol, is typically a private key or a symmetric key. Additionally, the computing device can tie the use of these authentication secrets to the identity of the configuration (e.g., the processor and/or software) that requests their use. Thus, the authenticator can establish the identity of the computing device, as well as the software executing on it.

Two operations, the Quote operation and the PKUnseal operation, are the respective gating functions for public key signing and public key decryption. The guard implementing these gating functions has access to a signing key Ks and a decryption key Kd. Both the signing key Ks and the decryption key Kd are also referred to as the private key of a public/private key pair. This public/private key pair is a key pair of the guard implementing the Quote and PKUnseal operations.

The Quote operation returns a public key signature over a combination of (e.g., the concatenation of) the input to the Quote operation and a condition that identifies when and/or to whom the secret may be revealed. Analogous to the Seal and UnSeal operations discussed above, revealing of the secret can be tied to any of a variety of conditions. In one implementation, the condition is an identifier of (e.g., digest of) the calling program.

Inherent in the signature is the assertion that the operation was performed at the request of the identified calling program. The Quote operation works in conjunction with a Verify operation, which typically executes on a device other than the device on which the Quote operation executes (e.g., on a remote server device, on a smart card, etc.). The Verify operation performs a public key signature verification and retrieves and evaluates the identifier of the calling program (and/or other conditions for revealing the secret).

Pseudo code for the Quote operation is illustrated in Table V. In the pseudo code of Table V, ID( ) refers to the ID( ) function discussed above, a refers to the data input to the Quote operation, and Ks refers to a signing key.

TABLE V d = ID( )
return sn=Signature$_{Ks}$(d, a)

Thus, as can be seen in Table V, the Quote operation obtains a digest of the calling program and receives an input value a. The Quote operation generates a digital signature (sn) of the input value a and the digest of the calling program using the signing key Ks. The input value a can be generated by the calling program, or alternatively may be a value that is received from another component or device (e.g., from the device that will be performing the Verify operation). The digital signature is generated using public key cryptography.

Figure 7:
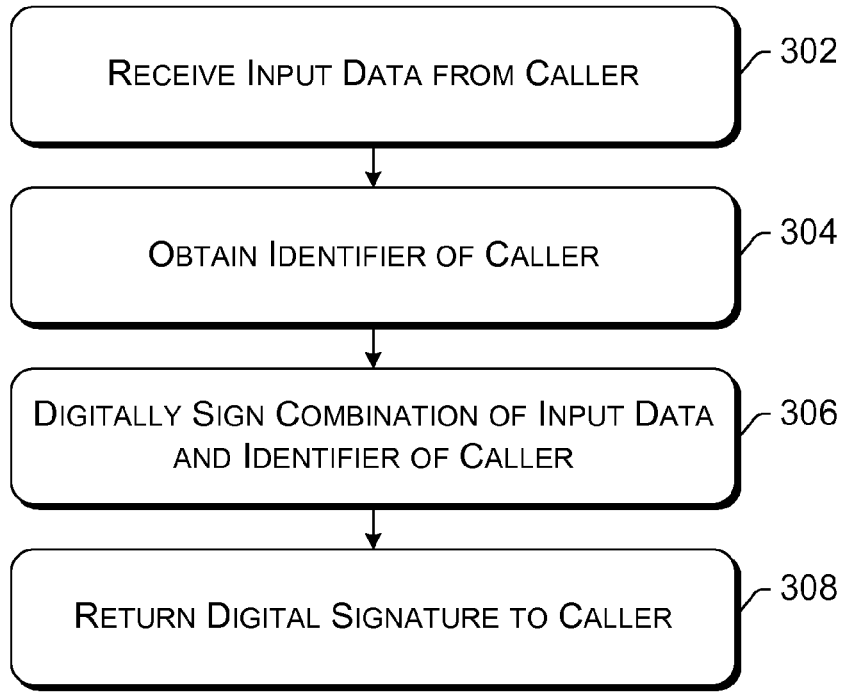
FIG. 7 is a flowchart illustrating an exemplary process for implementing the Quote operation.

FIG. 7 is a flowchart illustrating an exemplary process 300 for implementing the Quote operation. Process 300 is performed by a guard 104 of FIG. 1, and may be implemented in hardware, software, firmware, or a combination thereof.

Initially, input data is received from a caller (act 302). An identifier of the caller (an/or one or more other conditions for retrieving the input data) is obtained (act 304) and a digital signature over the combination of the input data and the identifier (and/or one or more other conditions) of the caller is generated (act 306). The generated digital signature is then returned to the caller (act 308).

The Verify operation performs a public key signature verification and retrieves and evaluates the identifier of the calling program. The Verify operation receives a digital signature that was generated by a Quote operation, typically from a device other than the device on which the Verify operation executes (e.g., on a remote server device, on a smart card, etc.). The Verify operation extracts the digest of the program (e.g., an application program, operating system, firmware program, etc.) that called the Quote operation from the received digital signature, and evaluates that digest to determine how to proceed.

Pseudo code for the Verify operation is illustrated in Table VI. In the pseudo code of Table VI, d refers to the digest of the program that called the Quote operation, a refers to the value that was input to the Quote operation, and Sn refers to the digital signature received by the Verify operation as an input.

TABLE VI $(d,a) = Extract_{Kv}(Sn)$
Evaluate(d)

Thus, as can be seen in Table VI, the Verify operation receives a digital signature and, using verification key Kv (which is the public key of the public/private key pair that includes the signing key Ks) extracts the digest d and the value a from the signature. The Verify program can then evaluate the digest d of the program that called the Quote operation. The manner in which the digest d is evaluated can vary. For example, the evaluation may involve comparing the digest d to a list of "approved" or "trusted" application programs.

Figure 8:
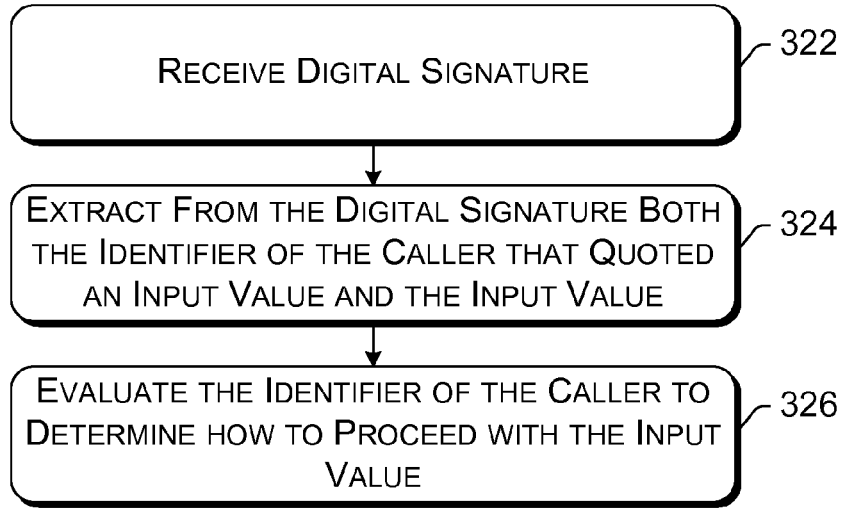
FIG. 8 is a flowchart illustrating an exemplary process for implementing the Verify operation.

FIG. 8 is a flowchart illustrating an exemplary process 320 for implementing the Verify operation. Process 320 is performed by a guard 104 of FIG. 1, and may be implemented in hardware, software, firmware, or a combination thereof.

Initially, a digital signature is received (act 322). Both the identifier of the caller (and/or one or more other conditions for retrieving the input value) that quoted an input value (using the Quote operation) and the input value itself are extracted from the digital signature (act 324). The identifier of the caller (and/or the one or more other extracted conditions) is then evaluated to determine how to proceed with the input value (act 326).

The PKUnseal operation is a version of public key decryption, which is gated on the identity of the caller (e.g., the digest of the calling program), or alternatively one or more other conditions. The result of the public key decryption of the input c to the PKUnseal operation is interpreted as a pair (d, s), where s is a secret and d identifies a configuration (e.g., digest of a calling program) to which s may be revealed. If the caller of PKUnseal is not d then the PKUnseal operation faills. The input c to the PKUnseal operation is generated by a second operation PKSeal, which can be executed on a device other than the device on which the PKUnseal operation executes (e.g., on a remote server device, on a smart card, etc.). The PKSeal operation performs a public key encryption of a pair (d, s). The PKUnseal and PKSeal operations can also be used to implement sealed storage.

Pseudo code for the PKUnseal operation is illustrated in Table VII. In the pseudo code of Table VII, ID( ) refers to the ID( ) function discussed above, c refers to the input to the PKUnseal operation, [dl, . . . , $d_m$] refers to the digest(s) of the one or more calling programs to which s can be revealed (or alternatively one or more other conditions), s refers to the protected data, and Kd refers to a decryption key (a private key of a public/private key pair associated with the guard that is implementing the PKUnseal operation).

TABLE VII ([d1, ..., $d_m$], s) = $Decrypt_{Kd}(c)$
if ID( ) is in [d1, ..., $d_m$] then return s
else fail Thus, as can be seen in Table VII, the PKUnseal operation decrypts the input value a using public key decryption and the decryption key Kd. The decrypted input value includes the digest(s) [dl, . . . , $d_m$] of one or more calling programs to which the protected data s is allowed to be revealed (or alternatively one or more other conditions identifying when and/or to whom the protected data s is allowed to be revealed). The PKUnseal operation also generates a digest of the calling program. If the digest of the calling program is equal to one of the digests [dl, . . . , $d_m$], then the protected data s is returned to the calling program. However, if the digest of the calling program is not equal to one of the digests [dl, . . . , $d_m$], then the protected data s is not returned to the calling program.

Figure 9:
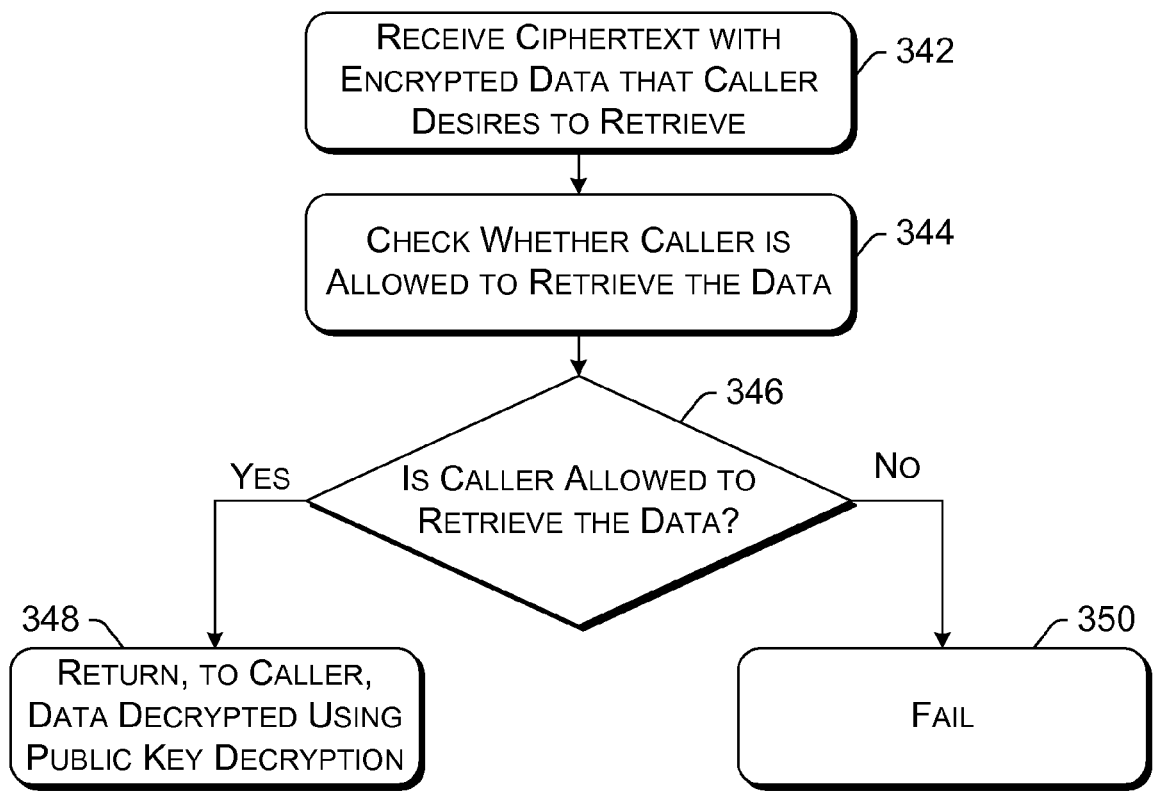
FIG. 9 is a flowchart illustrating an exemplary process for implementing the Seal operation

FIG. 9 is a flowchart illustrating an exemplary process 340 for implementing the PKUnseal operation. Process 340 is performed by a guard 104 of FIG. 1, and may be implemented in hardware, software, firmware, or a combination thereof.

Initially, ciphertext with encrypted data that the caller desires to retrieve is received (act 342). A check is made as to whether the caller is allowed to retrieve the data (act 344), and processing proceeds based on whether the caller is allowed to retrieve the data (act 346). If the caller is allowed to retrieve the data, then the data (decrypted using public key decryption) is returned to the caller (act 348). If the caller is not allowed to retrieve the data, then the process faills (act 350) and the data is not returned to the caller.

The PKSeal operation is a version of public key encryption, which is gated on the identity of the caller (e.g., the digest of the calling program or one or more other programs). The PKSeal operation performs a public key encryption of a pair (d, s), where s is a secret and d identifies one or more configurations (e.g., digests of a calling program) to which s may be revealed.

Pseudo code for the PKSeal operation is illustrated in Table VIII. In the pseudo code of Table VIII, c refers to the output of the PKSeal operation, [dl, . . . , $d_m$] refers to the digest(s) of the one or more calling programs to which s can be revealed, s refers to the protected data, and Ke refers to an encryption key.

TABLE VIII c = $Encrypt_{Ke}$([d1, ..., $d_m$], s)
return c

Thus, as can be seen in Table VIII, the PKSeal operation receives as an input the protected data s and digests [dl, . . . , $d_m$] of one or more programs to which the protected data s can be revealed. The pair [dl, . . . , $d_m$], s is then encrypted using public key cryptography based on the encryption key Ke. The encryption key Ke is the public key of the guard that is intended to be able to decrypt the ciphertext. The ciphertext resulting from the public key encryption is then returned to the calling program.

Figure 10:
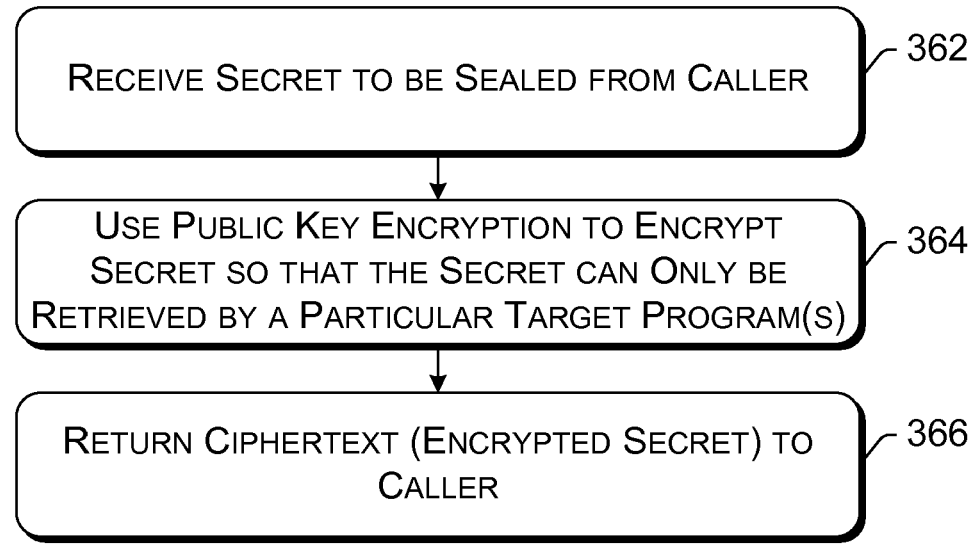
FIG. 10 is a flowchart illustrating an exemplary process for implementing the PKSeal operation.

FIG. 10 is a flowchart illustrating an exemplary process 360 for implementing the PKSeal operation. Process 360 is performed by a guard 104 of FIG. 1, and may be implemented in hardware, software, firmware, or a combination thereof.

Initially, a secret to be sealed is received from the caller (act 362). The secret is encrypted using public key encryption so that the secret can only be retrieved by a particular target program(s) (act 364), or alternatively only if one or more other conditions are satisfied. Ciphertext including the encrypted secret is then returned to the caller (act 366). Additional information may also be returned to the caller (as part of the ciphertext or separate from the ciphertext), such as a digest of the caller and/or digest(s) of the target program(s).

The Quote and PKUnseal operations are intended to be used in connection with public key authentication protocols. Most public key authentication protocols can be straightforwardly adapted by replacing any call to public key decryption, public key encryption, signing, and signature verification by a call to PKUnseal, PKSeal, Quote, Verify, respectively.

In some situations, it is important to be able to obtain a random number (e.g., as a basis for generating cryptographic keys). Random numbers can be obtained in a variety of different manners. In one implementation, the source of random numbers is a cryptographically strong random number generator implemented in the hardware of the computing device.

One alternative to the Seal operation discussed above is a GenSeal operation that combines the Seal operation with a generate random number operation. The GenSeal operation receives as input the digests $[t1, \ldots, t_m]$ of target program(s) that should be able to retrieve the secret (and/or other conditions that must be satisfied in order for the secret to be retrieved). The GenSeal operation generates a random number and seals the newly generated random number so that it can be retrieved only by calling programs having one of the target digest(s) $[t1, \ldots, t_m]$ (and/or the other conditions satisfied).

Pseudo code for the GenSeal operation is illustrated in Table IX. In the pseudo code of Table IX, ID( ) refers to the ID( ) function discussed above, c refers to the output of the GenSeal operation, s refers to the newly generated random number, $[t1, \ldots, t_m]$ refer to one or more target program(s) that should be permitted to retrieve the value s (one of which may optionally be the program calling the GenSeal operation) or alternatively one or more other conditions, and GenRandom( ) refers to a function that generates a random number.

TABLE IX

```
d = ID( )
s = GenRandom( )
c = store (s, [t1, ..., t_m], d)
return c
```

Figure 11:
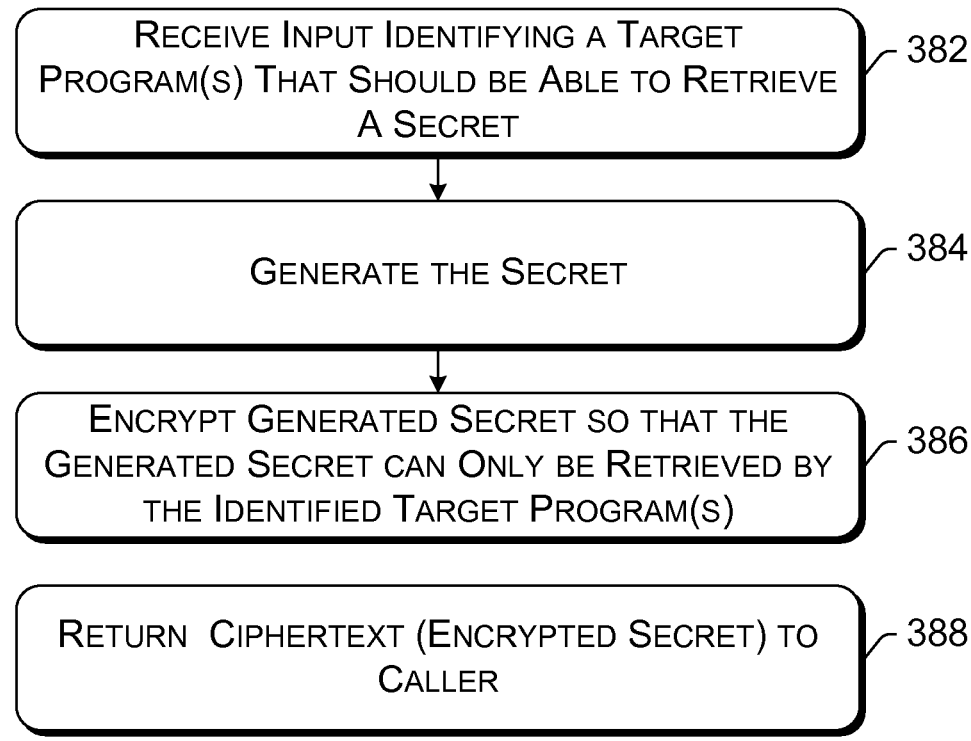
FIG. 11 is a flowchart illustrating an exemplary process for implementing the GenSeal operation.

FIG. 11 is a flowchart illustrating an exemplary process 380 for implementing the GenSeal operation. Process 380 is performed by a guard 104 of FIG. 1, and may be implemented in hardware, software, firmware, or a combination thereof.

Initially, an input is received from a caller that identifies a target program(s) that should be able to retrieve a secret (act 382), or alternatively one or more other conditions that are to be satisfied in order for the secret to be retrieved. A secret is then generated (act 384), and the secret is encrypted so that the secret can only be retrieved by the identified target program(s) (act 386), or alternatively so that the secret can be retrieved only if the one or more other conditions are satisfied. Ciphertext including the encrypted secret is then returned to the caller (act 388). Additional information may also be returned to the caller (as part of the ciphertext or separate from the ciphertext), such as a digest of the caller and/or digest(s) of the target program(s).

The services provided by a disclosure guard can be used for general-purpose sealing services. For example, referring back to FIGS. 1 and 2, layer n-1 reveals a single key to layer n based on the identity of layer n on initialization (e.g., after reset or booting of the computing device, or upon beginning execution of a program). Layer n caches this key and uses it to encrypt additional secrets. The next time the platform is booted into the same configuration, the disclosure guard provides the same root-key (e.g., through UnSeal or PKUnseal), and all the secrets previously encrypted can be retrieved by layer n.

In certain embodiments, a lower layer discloses one or more secrets to the next layer when that next layer is initialized (e.g., after reset or booting of the computing device, or upon beginning execution of a program). Following this gated disclosure, the lower layer is no longer used (until the next boot or reset). This use-model is also referred to as the disclosure guard model. By employing the disclosure guard model, accesses to the lower layer are reduced.

The gating functions discussed herein can be used with service guards and disclosure guards implemented using time isolation and space isolation. Four service model implementations for authenticated operation are discussed below: (1) service guard—space isolation; (2) disclosure guard—space isolation; (3) disclosure guard—time isolation; (4) service guard—time isolation. In the discussion of these service models, assume that a lower-level guard has disclosed one or more keys to the guard at the layer being considered. The manner in which these keys are obtained depends on the guard and isolation model of the layer beneath. Different layers on the same computing device can use different ones of these service models.

(1) Service guard—space isolation: The guard measures and saves the identity of the requesting program when it is initialized. The guard implements a protection system using processor services (e.g., of a CPU or some other security processor or co-processor), and a system-call interface exposing the authenticated operation primitive operations.

(2) Disclosure guard—space isolation: The guard obtains service requests on initialization in the form of cryptographic blobs. The blobs could be stored in memory, or alternatively obtained from external storage devices. The guard measures the identity of programs that it initializes, and discloses keys to programs according to the gating functions described above. Before relinquishing control to the next layer, the guard establishes mode-protection for itself and its secret resources.

(3) Disclosure guard—time isolation: The guard obtains service requests on initialization in the form of cryptographic blobs (groups of bits). The blobs could be stored in memory, or alternatively obtained from external storage devices. The guard measures the identity of programs that it initializes, and discloses keys to programs according to the gating functions described above. Before passing control to these programs, the guard deletes (or otherwise makes inaccessible) the keys used to implement the gating functions.

(4) Service guard—time isolation: In the service guard—time isolation model, the computing device securely preserves program state across the security reset. This model is similar to model (1) (service guard—space isolation), however, before passing control to the next layer, the service guard deletes its secret (rendering it non-functional until the next reboot). The next layer will now execute normally, until it needs to request a service from the guard. At that point, it stores the parameters of the request somewhere in memory where they will survive a reset and performs a reset. As the device reboots, the service guard obtains its secret, sees the request, executes it (using its key), destroys the key and any related information, and passes the result of the computation and control to the next layer (the layer that had originally requested the service).

In certain embodiments, if a computing device supports space isolation, then the security kernel should expose the primitives (operations) Seal, Unseal, GetRandom (to obtain a random number), and PKUnseal (or Quote). The security kernel can implement a disclosure guard or a service guard. On the other hand, if the platform supports time isolation, then the security kernel should provide a disclosure guard, and should implement the primitives (operations) Unseal, GenSeal, and PKUnseal (or Quote).

It should also be noted that Quote and PKUnseal functionality can be built on the Seal and Unseal or Unseal and GenSeal primitives. For example, manufacturers can build an $l_2$ program(s) that implements Quote or PKUnseal and acts as a host for higher-level software (e.g., operating systems) upon GenSeal and Unseal implemented in $l_1$. The manufacturer can generate and Seal the keys needed by the service layer and ship them with the device or CPU (or make them available online).

An exemplary description of a family of hardware implementations that will enable platforms to support authenticated operation follows. As with higher layers in the system, the characteristics of the lowest layer ($l_1$ of FIG. 2) are: (a) secret key resources, (b) privileged code that has access to these keys, and (c) controlled initialization of the layer.

Authenticated operation provides a strong binding between programs and secret keys. At higher layers, guards in lower layers guarantee this binding. At the lowest layer, there is no underlying software guard that can gate access to the platform secrets. Thus, another mechanism is used to support the association of the $l_1$ keys to the $l_1$ program. One way of accomplishing this binding is having $l_1$ software be platform microcode or firmware that is not changeable following manufacture, and give the $l_1$ software unrestricted access to the $l_1$ keys. This platform microcode or firmware can then be referred to as the security kernel, and the $l_1$ keys referred to as the platform keys. The platform is designed to only pass control to a predetermined security kernel. The hardware behavior can also be explained as a simple resource guard that discloses the platform keys to the predefined security kernel.

The platform keys and the security kernel firmware can be part of the processor or alternatively implemented in one or more other components in the computing device (e.g., a security processor or coprocessor, which may also perform cryptographic operations). The platform keys and the security kernel firmware can be implemented in a single component, or alternatively implemented in multiple components of the computing device.

With authenticated operation, programs are started in a controlled initial state. At higher levels, the software running at lower levels can be entrusted to start execution at the correct entry point. At $l_1$, however, hardware performs this function. Typically, on power-up or following reset, current processors begin execution by following some deterministic sequence. For example, in the simplest case the processor starts fetching and executing code from an architecturally-defined memory location. For $l_1$, programs can be started in a controlled initial state by the hardware ensuring that the security kernel is the code that executes on startup (as part of the deterministic sequence).

Additionally, no other platform state should be able to subvert execution of the security kernel. Reset and power-up provide a robust and a well-debugged state-clear for the processor. As used in this example, the platform state change that is used to start or invoke the security kernel is referred to as a security reset.

Furthermore, a device manufacturer should arrange for the generation or installation of the platform keys used by the $l_1$ implementation of Seal and Unseal. If the device is to be recognized as part of a PKI (Public Key Infrastructure), the manufacturer should also certify a public key for the platform. This can be a platform key used directly by $l_1$, or alternatively a key used by a higher layer.

Key generation and certification can be the responsibility of the CPU manufacturer or alternatively some other party, such as the OEM that assembles the CPU into a device. Alternatively, the responsibility can be shared by multiple such parties.

Once the security kernel is executing it can use the isolation mechanisms described above to protect itself from code executing at higher layers. Isolation in space will typically involve privilege mode support, and isolation in time will typically involve secrets being hidden from upper layers.

No additional platform support is needed to support space isolation on most current processors—an existing privilege mode or level will suffice (as long as the hardware resource that allows access to the platform key can be protected from higher layers).

To support time isolation, hardware assistance is used to allow the security kernel to conceal the platform key before passing control to higher layers. One way to provide platform key security in the time isolation model is to employ a stateful guard circuit that is referred to as a reset latch. A reset latch is a hardware circuit that has the property that it is open following reset or power-up, but any software at any time can programmatically close the latch. Once closed, the latch remains closed until the next reset or power-up. A platform that implements a time-isolated security kernel should gate platform key access on the state of a reset latch, and the security kernel should close the latch before passing control to higher layers. As mentioned above, the security kernel should also take additional actions such as clearing memory and registers before passing control, but these action are the same as those used at higher levels.

If the platform employs space isolation then the security kernel uses privilege modes to protect itself and its platform keys from programs (e.g., operating systems) that it hosts. Furthermore, the security kernel establishes a system call interface for invocation of the authentication operations.

If the platform employs space isolation, then the platform should also contain storage that survives a security reset to pass parameters to service routines. To invoke a service, an operating system prepares a command and parameter block in a memory location known to the security kernel and performs a security reset. If the OS wishes to continue execution following the service call (as opposed to a simple restart) then it and the security kernel should take extra measures to ensure that this can be done reliably and safely.

The authenticated operation discussed herein can be used for security in a variety of settings, such as protecting personal data from viruses, protecting confidential server data from network attacks, network administration, copy protection, trustworthy distributed computing, and so forth. The authenticated operation allows different programs, which can execute on the same computer without being in a particular trust relationship, to preserve their cryptographic resources irrespective of the actions of other software.

Some of the discussions below make reference to an SSP (Secure Service Processor). In one embodiment, an SSP is a processor (for use in a computing device) that provides basic cryptographic services to a computing device (e.g., the SSP supports the gating functions described herein (e.g., as layer $l_1$ of FIG. 2)). The SSP can make use of cryptographic keys, and typically has one or more cryptographic keys that are unique (or expected to be unique) to that SSP. The SSP can be part of the CPU(s) of the device, or alternatively one or more other processors. For example, the SSP may be a separate chip or integrated circuit (IC) in a computing device.

In a different embodiment, an SSP is an appropriately isolated software program that exposes the same functionality to its callers as the previous embodiment does. The SSP embodiment has access (directly or indirectly) to cryptographic keys. A number of implementation options exist for providing such access. For example, the SSP may call service or disclosure guards in lower layers. Or the SSP may have exclusive access to some part of persistent memory (e.g. hard disk, flash memory, ROM, etc.) that contains the required cryptographic key(s).

In summary, an SSP is defined by the functionality it exposes to principals in a higher layer. An SSP is a guard (as described above) with access (direct or indirect) to cryptographic keys. The SSP uses these keys to provide cryptographic services to its callers. The following sections will describe exemplary functionality an SSP exposes.

Example Operations

The following is a discussion of example implementations of sealed storage operations and of remote authentication operations. This section illustrates example implementations of the Seal, UnSeal, Quote, and PKUnseal operations discussed above.

The following definitions are used in this section:

| Name | Type | Description |
| --- | --- | --- |
| DIGEST | BYTE[20] | 160-bit value. Commonly the output of a SHA-1 hash operation. |
| SECRET | BYTE[32] | 256 bit value. Commonly a secret to be sealed or pksealed. |
| ordinal | INTEGER | The ordinal component of each input and output structure identifies the operation to which it belongs and whether it is an input or an output structure. |
| $K_M$ | 256-bit key | Key for HMAC operations. |
| $K_S$ | 256-bit key | AES key for Seal and UnSeal. |
| $K_U$ | 2048 bits * 3 | RSA key pair for PKUnseal |
| $K_Q$ | 2048 bits * 3 | RSA key pair for Quote. |
| R | 128 bits | Random number |

Additionally, access policies are referred to in this section and the Bound Key Operations section below. The access policy describes when the particular operations are functional (that is, when they will work). The user of a computing device is able to selectively switch off certain functions. For example, the computing device (e.g., a SSP that implements the Seal operation) includes a register called FeatureEnable. One of the bits in the register is called MainEnable. If the user sets MainEnable to false then none of the functions in these sections will work any more. The access policy description included with each function describes under which FeatureEnable settings the function will work.

Seal

Definition
SSP_STATUS Seal(
 [in] SECRET S,
 [in] DIGEST Target[2],
 [in] UINT32 MaxLen,
 [out] UINT32* ActualLen,
 [out] BYTE* SealedBlob
)

-continued

Seal

Parameters
Seal-Input ::=   SEQUENCE {
  ordinal    INTEGER,
  secret     Secret,
  target     DigestPair }
Seal-Output ::=  SEQUENCE {
  ordinal    INTEGER,
  status     INTEGER,
  sealed-blob OCTET STRING }
Return Values
SSP_SUCCESS Comments The Seal operation forms an encrypted blob (group of bits) that can only be decrypted by the corresponding Unseal operation if the following evaluate true:
 Is the encoding correct?
 Is the MAC correct?
 Is the currently running SK/SL (Security Kernel or Secure Loader) the one named as the Target during the Seal operation?

Seal adds internal randomness so that the output of the Seal operation on the same input produces different results. This ensures that Seal cannot be used as a hardware device identifier. Seal also includes an identifier of the program calling the Seal operation (e.g., a digest of the calling program saved in a PCR register of the SSP, also referred to herein as the PCR value) when the seal was performed to provide integrity information to the unsealer.

Access Policy
 Allowed=FeatureEnable.MainEnable & (FeatureEnable.UseSymmKey==All|FeatureEnable.UseSymmKey==AuthSL
  & SLKnown & AuthPCR[CurrentSL].UseSymmKey)

Actions
 The Seal operation implements the following actions:
  1. Generate a 128-bit random number R
  2. Let D0 be the current value of the PCR[0], D1=PCR[1]
  3. DIGEST M=HMAC[$K_M$](R||S||target||D0||D1)
  4. C=AES[$K_S$](R||S||Target||D0||D1||M)
  5. Return SSP_SUCCESS with SealedBlob set to C Unseal Definition
SSP_STATUS Unseal(
 [in] BYTE* SealedBlob,
 [in] UINT32 SealedBlobLen,
 [out] SECRET S,
 [out] DIGEST Source
)
Parameters
Unseal-Input ::=   SEQUENCE {
  ordinal      INTEGER,
  sealed-blob OCTET STRING }
Unseal-Output ::=  SEQUENCE {
  ordinal    INTEGER,
  status     INTEGER,
  secret     Secret,
  source     Digest    }
Return Values
SSP_SUCCESS
SSP_UNSEAL_ERROR Comments The Unseal operation internally decrypts a blob generated by the Seal operation and checks the following conditions:
Is the encoding correct?
Is the current value of the PCR the one named as the Target during the Seal operation?
If all checks succeed, then the secret and the sealer's PCR is returned; otherwise an UNSEAL_ERROR is returned.

Access Policy
Allowed=FeatureEnable.MainEnable & (FeatureEnable.UseSymmKey==All|FeatureEnable.UseSymmKey==AuthSL
& SLKnown & AuthPCR[CurrentSL].UseSymmKey)

Actions
The Unseal operation implements the following actions:
1. M=AES-1 [$K_S$](SealedBlob).
2. Interpret M as (BITS[128] R||SECRET S1||DIGEST Target0||DIGEST Target1||DIGEST Sealer0||DIGEST Sealer1||DIGEST N).
3. DIGEST D=HMAC[$K_M$] (R||S1||Target0||Target1||Sealer0||Sealer1).
4. If (Target0!=PCR[0] Target1!=PCR[1]) return SSP_UNSEAL_ERROR with S, Source set to zero.
5. If D!=N return SSP_UNSEAL_ERROR with S, Source set to zero.
6. Else return SSP_SUCCESS with S set to S1 and Source set to {Sealer0, Sealer1}.

| Quote |
| --- |
| Definition |
| SSP_STATUS Quote( |
|     [in] BITSTRING d-ext, |
|     [out] PKSignature SigBlob |
| ) |
| Parameters |
| Quote-Input ::= { |
|     ordinal    INTEGER, |
|     d-ext    Digest } |
| Quote-output ::= { |
|     ordinal    INTEGER, |
|     status    INTEGER, |
|     sig-blob    PKSignature } |
| Return Values |
| SSP_SUCCESS |
| SSP_CRYPTO_ERROR |

Comments

The Quote operation instructs the SSP to sign the concatenation of the externally supplied D-EXT and the internal PCR value.

Access Policy
Allowed=FeatureEnable.MainEnable & (FeatureEnable.UsePrivKey==All|FeatureEnable.UsePrivKey==AuthSL
& SLKnown & AuthPCR[CurrentSL].UsePrivKey)

Actions
The Quote operation implements the following actions:
1. The SSP forms a message M consisting of the concatenation of the identifier for message type QuoteMessage, D-EXT and the contents of the PCR register, under DER (Distinguished Encoding Rules) encoding:

| SEQUENCE { |
| --- |
| message-type PKMessageType, |

| -continued |
| --- |
|     d-ext    Digest, |
|     pcr    DigestPair |
| } |

2. The SSP then uses $K_Q$.PRIV to generate a signed message over M according to the default implementation of RSASSA-PSS-SIGN as specified in PKCS #1 V2.1. If the function returns an error then return SSP_CRYPTO_ERROR with SigBlob set to 0.
3. The SSP returns SSP_SUCCESS and the signature value just calculated together with signatureAlgorithm=rSASSA-PSS-Default-Identifier in SigBlob.

| PKUnseal |
| --- |
| Definition |
| SSP_STATUS PK_Unseal( |
|     [in] PKCiphertext SealedBlob, |
|     [out] SECRET Secret |
| ) |
| Parameters |
| PkUnseal-Input ::= { |
|     ordinal    INTEGER, |
|     pk-sealed-blob    PKCiphertext } |
| PkUnseal-output ::= { |
|     ordinal    INTEGER, |
|     status    INTEGER, |
|     secret    Secret } |
| Return Values |
| SSP_SUCCESS |
| SSP_CRYPTO_ERROR |
| SSP_BAD_DATA_ERROR |

Comments

The PKUnseal operation takes an encrypted blob of length 416 bits, and of a particular format. The blob is decrypted, and if the decryption and decoding is successful, the 416-bit message is interpreted as the concatenation of a secret value and the PCR value that is permitted to receive the decrypted value.

If the current PCR value is equal to that specified in the encrypted blob, the secret is revealed; otherwise an error is returned.

Access Policy
Allowed=FeatureEnable.MainEnable & (FeatureEnable.UsePrivKey==All|FeatureEnable.UsePrivKey==AuthSL
& SLKnown & AuthPCR[CurrentSL].UsePrivKey)

Actions
The PKUnseal operation implements the following actions:
1. The SSP tests if the AlgorithmIdentifier in pk-sealed-blob is sspV1BoundKey.
2. The SSP internally decrypts SealedBlob according to the default implementation of RSAES-OAEP-DECRYPT as specified in PKCS #1 V2.1, obtaining a plaintext message M.
3. If the output of the decoding operation is "decoding error" return SSP_BAD_DATA_ERROR with Secret set to zero.
4. Otherwise, the recovered message M should be of the following form under DER encoding:

| SEQUENCE { |
| --- |
| message-typePKMessageType, |

-continued

```
secret      Secret,
target      Digest }
```

Furthermore, Secret should consist of 256 bits (=32 octets) and target should consist of 160 bits (=20 octets). The message type should be sspV1PKSealedMessage. If any of these conditions is not met, return SSP_BAD_DATA_ERROR with Secret set to zero, otherwise:

1. If target!=PCR return SSP_BAD_DATA_ERROR with Secret set to zero.
2. If target==PCR return SSP_SUCCESS with Secret set to secret.

Bound Key Operations

Additionally, a set of bound key functions or operations allow cryptographic keys to be created and certified locally (e.g., by the SSP), and also allow cryptographic keys to be communicated from trustworthy remote parties (e.g., communicated to the SSP).

Bound key functionality is characterized as follows:

1. A service guard (e.g. SSP) at some system layer accesses a bound key directly. Each bound key has an associated condition(s) that determines which guard(s) may access the bound key. The condition(s) is expressed implicitly. That is, the bound key is encrypted, such that only one or some set of guards have the keys to decrypt it.
2. A service guard with access to a bound key exposes functions that require the use of the bound key (e.g. signing, MAC, encryption, decryption) to principals in a higher layer. Each bound key may have an associated usage condition(s), in which case the guard will only service requests that satisfy the associated condition(s).
3. Bound keys are contained in cryptographically protected data structures (also referred to herein bound key blobs). Bound key blobs are self protecting and can be stored outside trusted environments.

Bound keys have the following benefits:

Each principal can be allowed to have its own bound key. Furthermore, each principal can be allowed to have arbitrarily many bound keys. This allows for more fine grained policy settings and improves privacy in certain applications. Thus, guards need not be restricted to having only one or a few keys that are used to service requests from all principals.

The bound key is not disclosed outside the authorized service guard(s). Thus, a compromise of a principal (e.g. due to a programming error) will not lead to a compromise of any bound key. In one embodiment, the service guard (SSP) is implemented in hardware. In this case, bound keys cannot be compromised due to malicious or incorrect software.

The bound key functions provide protection for cryptographic keys. Bound keys can be generated by remote parties or they can be created locally through the GenBoundKey command.

Bound keys that are generated locally may emit a "quote" certificate that can be used to provide remote parties with evidence of the type of the public key, the type of key generated, the state of the machine during generation, and the (optional) condition (e.g. digests) to which the key is bound.

Bound keys include one or more of the following elements:

The key usage (e.g., BoundSign, BoundQuote, BoundPkUnseal, BoundPkDecrypt, BoundMAC, BoundEncrypt, or BoundDecrypt). This element is optional. If included, this element restricts the bound key to being used only with the identified function type.

A condition element (as described above) that specifies under which conditions the bound key can be used (also referred to as bound key usage condition(s)). For example, the condition(s) may be represented in the form of one or more digests of programs. In this case, the bound key must only be used by or on behalf of programs whose digest is specified. Other examples of conditions include time constraints, logical formulas, and executable programs, as described above. This element is optional. If the element is omitted, some default condition applies. For example, the default condition may not restrict access to the bound key (vacuous condition).

The cryptographic key (the bound key) or some data that allows the key to be computed.

One or more conditions (as described above) under which the bound key usage condition can be changed. Such changing is also referred to as bound key migration, and the condition(s) a migration condition(s). This element is optional. If the element is omitted, some default condition applies. For example, the default conditions may be "always false", such that the digests (if present) cannot be changed.

One or more conditions, under which the set of service guards that can directly access the bound key can be changed. Such changing is also referred to as bound key exportation, and the condition(s) an export condition(s). This element is optional.

Cryptographic Protection of Bound Keys

Bound keys have the same cryptographic requirements as the sealed storage and attestation functions described above (Seal, UnSeal, PKUnseal). In particular, locally generated bound keys could be protected by any of the cryptographic implementations of the Store and Retrieve functions described above. In each case, the confidentiality of the bound key itself is protected and the integrity of the overall data structure is protected in order to ensure that the different conditions that govern the usage of the bound key have not been corrupted. As described earlier, this can be achieved by various combinations of symmetric ciphers or public key encryption algorithms with MACs or digital signatures. In one embodiment, the bound key data structure is public key encrypted.

Functions

In certain embodiments, bound keys can be used in one or more of the following functions:

BoundSign
BoundQuote
BoundPkDecrypt
BoundPkUnseal
BoundMAC
BoundEncrypt
BoundDecrypt
GenBoundKey
BoundKeyMigrate
BoundKeyExport In each of these functions, the bound key blob (the group of bits in the data structure) and the data to be operated on by the key contained within the bound key blob are provided as parameters to the bound-key functions. If the key usage element is included in the bound key blob, then the SSP ensures that the bound key is used for the correct purpose (for example, a key that was created with type "BoundQuoteKey" can only be used in a BoundQuote operation).

In some implementations, the bound key is a private key of a public/private key pair. In such implementations, the bound key blob can contain the private key, or alternatively some data that allows the key to be computed. For example, a private key fragment may be contained in the bound key blob, and this fragment, in conjunction with the corresponding public key, can be used to reconstruct the private key of the public/private key pair.

The BoundSign operation receives a data input that is to be signed using the bound key, and also receives a bound key blob. The SSP recovers the private signing key from the bound key blob and then generates a digitally signed message over the data input using the recovered signing key. The SSP then outputs the digitally signed message. If the bound key blob is corrupted or the bound key usage condition(s), if any, are not satisfied, then the SSP does not perform the operation. The data input can thus be digitally signed using the recovered private key without the private key being revealed by the SSP.

The BoundQuote operation receives as an input data to be signed and a bound key blob. The SSP recovers the private key from the bound key blob and then uses the recovered signing key to generate a signature over the data input to the operation and the current PCR value (e.g., an identifier, such as a digest, of the program invoking the BoundQuote operation) as in the Quote operation described above. The SSP then outputs the digitally signed message. If the bound key blob is corrupted or the bound key usage condition(s), if any, are not satisfied, then the SSP does not perform the operation. In one implementation, the BoundQuote operation is similar to the BoundSign operation, but differs in that the current PCR value is used in the BoundQuote operation.

The BoundPkDecrypt operation receives as an input ciphertext and a bound key blob. The SSP recovers the private key from the bound key blob and then uses the recovered private bound key to decrypt the input ciphertext. The decrypted data is then output by the BoundPkDecrypt operation. If the bound key blob is corrupted or the bound key usage condition(s), if any, are not satisfied, then the SSP does not perform the operation.

The BoundPkUnseal operation receives as an input ciphertext and a bound key blob. The SSP recovers the private key from the bound key blob and then uses the private key to decrypt the input ciphertext as in the PKUnseal operation described above. The decrypted data is then output by the BoundPkUnseal operation. If the bound key blob is corrupted or the bound key usage condition(s), if any, are not satisfied, then the SSP does not perform the operation.

The BoundMAC operation receives a data input, over which the MAC is to be computed using the bound key, and also receives a bound key blob. If the bound key blob is corrupted or the bound key usage condition(s), if any, are not satisfied, then the SSP does not perform the operation. Otherwise, the SSP recovers the bound key from the bound key blob and then generates a message authentication code (MAC) over the data input using the recovered bound key. The SSP then outputs the computed MAC. Thus, a MAC for the data input can be computed using the recovered bound key without the bound key being revealed by the SSP.

The BoundEncrypt operation receives a data input, which is to be encrypted using the bound key, and also receives a bound key blob. If the bound key blob is corrupted or the bound key usage condition(s), if any, are not satisfied, then the SSP does not perform the operation. Otherwise, the SSP recovers the bound key from the bound key blob and then encrypts the data input using the recovered bound key. The SSP then outputs the computed ciphertext. Thus, the data input can be encrypted using the recovered bound key without the bound key being revealed by the SSP.

The BoundDecrypt operation receives a data input, which is to be decrypted using the bound key, and also receives a bound key blob. If the bound key blob is corrupted or the bound key usage condition(s), if any, are not satisfied, then the SSP does not perform the operation. Otherwise, the SSP recovers the bound key from the bound key blob and then decrypts the data input using the recovered bound key. The SSP then outputs the computed plaintext. Thus, the data input can be decrypted using the recovered bound key without the bound key being revealed by the SSP.

The GenBoundKey operation causes the SSP to create a new bound key. The new bound key is a cryptographic key, and a new bound key blob is generated that includes the newly generated key. It is to be appreciated that the bound key blob does not always have to include the entire key. For example, if the newly generated key is a public/private key pair, it may be sufficient to include the private key in the bound key blob.

The new bound key blob is bound to one or more guards—typically the SSP that is executing the operation (e.g., by cryptographically protecting the new bound key blob analogous to the Store function described above, or otherwise securing the new bound key blob so that it can be retrieved only by the SSP). The GenBoundKey operation may also have parameters that determine various aspects of the new bound key blob and data describing these parameters are attached to the newly generated private key in some integrity protected way (e.g., the data is made part of the new bound key blob). Examples of this data, as discussed above, include the migration condition, the bound key usage condition, and so forth. The new bound key blob is then output by the GenBoundKey operation.

In general, a bound key may be any kind of cryptographic key, including a symmetric key or a public-private key pair. The exact key type depends on the bound key operation(s) in which it is to be used. For example, a bound key to be used in BoundMAC would typically be a symmetric key, whereas a bound key to be used in BoundSign would typically be a public/private signature key pair. The key type may be specified as a parameter to GenBoundKey.

The BoundKeyMigrate operation allows the usage condition of a bound key to be changed. The SSP verifies that one or more migration conditions are satisfied. Any of a variety of conditions may be used with the BoundKeyMigrate operation (e.g., any condition, analogous to those discussed above with reference to the Seal and UnSeal operations, that identifies when and/or to whom the data can be migrated). If the verification is not successfully made, then the operation fails. If the verifications is successfully made, then the guard produces a new bound key blob, in which the bound key usage condition has been changed as requested.

The BoundKeyExport operation instructs the SSP to change the set of guards (SSPs) that can directly access the bound key. The SSP verifies that one or more conditions are satisfied. Any of a variety of conditions may be used with the BoundKeyExport operation (e.g., any condition, analogous to those discussed above with reference to the Seal and UnSeal operations, that identifies when and/or to whom the data can be exported). If the verification is not successfully made, then the operation fails. If the verification is successfully made, then the SSP changes the cryptographic protection on the bound key blob as requested. In one embodiment, the SSP encrypts the bound key data structure with one or more new keys.

An example of a class of conditions that the creator (whether local or remote) of a bound key can specify is that the bound key may only be used on behalf of principals whose program digests have a particular value(s). In this case, the bound key operations check the requesting principal's digest after internal retrieval of the bound key blob, and fail without performing additional computation if the digest is not as specified in the bound key blob.

A bound key blob is typically tied or bound to a particular SSP by means of a cryptographic operation that requires a unique key of the particular SSP to succeed. Examples of such operations are MAC, digital signatures, encryption, and combined encryption and integrity verification functions.

Example Bound Key Operations

In one implementation, migration is authorized by way of a local migration certificate or an export certificate issued by the authorizing entity. The local-migration certificate is a default of RSASSA-PSS-SIGN operation over the following data structure:

```
Bound-migration-info ::= SEQUENCE {
    source-bound-blob-digest    Digest,
    dest-PCR                    DigestPair
}
```

Local SSP-migration is requested using the BoundKeyMigrate operation. To authorize local-migration, the SSP is provided with a Bound-migration-info structure referring to this bound key, and a properly formed certificate over this structure provided by the authorized entity. If the migration authorization is acceptable, the SSP rebinds the key for the new PCR, with all other key attributes remaining unchanged (e.g., if the key was not originally bound to a PCR value, it will not be when rebound). The source-bound-blob-digest is the digest of the encrypted external form of the bound key.

Remote-migration is achieved through the BoundKeyExport function with, for example, a Bound-export-info structure signed by the authorizing entity:

```
Bound-export-info ::= SEQUENCE {
    source-bound-blob-digest    Digest,
    dest-pubkey                 RSAPublicKey
    dest-PCR                    DigestPair
}
```

The authorizing entity is in complete control of the device or software module to which the key is re-bound when a key is marked exportable.

The bound key operations use a PKCiphertext, which is a sequence of type Bound-key-blob encrypted with the platform public encryption key as follows:

```
Bound-key-blob ::=      SEQUENCE {
    message-type        PKMessageType,
    key-type            Bound-key-type,
    bound-to-PCR        BOOL,
    bound-to            DigestPair,
    migrateable         Bool,
    migrate-auth        Digest,
    exportable          Bool,
    export-auth         Digest,
    pub-key-digest      Digest,
    bound-key           PKCompressedPrivateKey }
```

-continued

```
where:
    Bound-key-type ::=      INTEGER {
        BoundSignKey,
        BoundQuoteKey,
        BoundDecryptKey,
        BoundPkUnsealKey }
```

The bound-to-PCR member is a flag that indicates whether the bound-to Digest field must match the current PCR value in order for the bound key to be used. {migrateable, migrate-auth} indicates whether the key is migrateable, and if so under the control of what authority (if migrateable is false, then the migrate-auth value is unimportant). {exportable, export-auth} indicates whether the key is exportable, and if so under the control of what authority (if exportable is false, then the export-auth value is unimportant). Pub-key-digest is the digest of the corresponding public key to provide a strong binding between the PKCompressedPrivateKey and the public key that is needed to recover the private key.

In one implementation, if a bound key is created locally with the GenBoundKey function, the SSP creates a signature over a data structure detailing the public properties of the key that was just generated, and the configuration of the system during bound key export.

```
Bound-key-pub-info ::=  SEQUENCE {
    message-type        PKMessageType,
                        // sspV1BoundKeyGenMessage
    sig-nonce           Digest,
    key-type            Bound-key-type,
    bound-to-PCR        BOOL,
    bound-to            DigestPair,
    migrateable         Bool,
    migrate-auth        Digest,
    exportable          Bool,
    export-auth         Digest,
    creator-PCR         DigestPair
    bound-pub-key       Digest }
```

In this data structure, key-type, bound-to-PCR, bound-to, migrateable, migrate-auth, exportable, and export-auth are the bound key characteristics of the newly generated key. Creator-PCR is the PCR that was active when the key was exported, and bound-pub-key is the digest of the newly created public key. signonce is the digest-sized value passed in when bound-key generation was requested.

Exemplary definitions of the BoundSign, BoundQuote, BoundPkDecrypt, BoundPkUnseal, GenBoundKey, BoundKeyMigrate, and BoundKeyExport operations are as follows.

BoundSign

Definition
SSP_STATUS BoundSign(
    [in] PKCiphertext BoundKeyBlob,
    [in] RSAPublicKey PubPartOfBoundKey,
    [in] BITSTRING DataToBeSigned
    [out] PKSignature sig-blob
)
Parameters
BoundSign-Input ::= {
    ordinal             INTEGER,
    bound-key           BoundKeyBlob,
    bound-pub-key       RSAPublicKey,
    data-to-be-signed   OCTET STRING }

| BoundSign |
| --- |
| BoundSign-output ::= {<br>    ordinal        INTEGER,<br>    status         INTEGER,<br>    sig-blob      PKSignature }<br>Return Values<br>SSP_SUCCESS<br>SSP_CRYPTO_ERROR<br>SSP_BAD_DATA_ERROR<br>SSP_UNSEAL_ERROR |

Comments

The BoundSign operation takes PKciphertext of type sspV1BoundKey containing a BoundKeyBlob of type BoundSignKey and the corresponding public key. If either of these conditions is not met, or if the sequence faills to decode, then the operation faills with SSP_CRYPTO_ERROR.

If Bound-to-PCR is set, the SSP checks that the current PCR value is as specified in the Bound-key-blob sequence. If it is not, the SSP returns SSP_CRYPTO_ERROR.

Finally, the SSP signs the input message with the decrypted private key.

Access Policy

Allowed=FeatureEnable.MainEnable & (FeatureEnable. UsePrivKey==All|FeatureEnable.UsePrivKey==AuthSL
   & SLKnown & AuthPCR[CurrentSL].UsePrivKey)

Actions

The BoundSign operation implements the following actions:

1. The SSP tests if the AlgorithmIdentifier in pk-sealed-blob is sspV1BoundKey.

2. The SSP internally decrypts SealedBlob according to the default implementation of RSAES-OAEP-DECRYPT as specified in PKCS #1 V2.1, obtaining a plaintext message M.

3. If the output of the decoding operation is "decoding error" return SSP_CRYPTO_ERROR with Secret set to zero.

4. Otherwise, the recovered message M should be a DER encoding of the form Bound-key-blob, with type BoundSign-Key. If not, the SSP should emit SSP_CRYPTO_ERROR.

5. If bound-to-PCR is TRUE, then the bound-to should be compared to the current PCR value. If the value is not the same, the SSP should output SSP_CRYPTO_ERROR.

6. The SSP then recovers the bound private key using the associated public key provided. If this faills, the SSP returns SSP_CRYPTO_ERROR. If it succeeds, the SSP uses the recovered private key bound-key to generate a signed message over the input message DataToBeSigned according to the default implementation of RSASSA-PSS-SIGN as specified in PKCS #1 V2.1 If the function returns an error, then return SSP_CRYPTO_ERROR with SigBlob set to 0.

7. Return SSP_SUCCESS

| BoundQuote |
| --- |
| Definition<br>SSP_STATUS BoundQuote(<br>    [in] PKCiphertext BoundKeyBlob,<br>    [in] DIGEST DataToBeSigned<br>    [out] PKSignature sig-blob<br>)<br>Parameters<br>BoundQuote-Input ::= { |

| BoundQuote |
| --- |
|     ordinal           INTEGER,<br>    bound-key       BoundKeyBlob,<br>    bound-pub-key   RSAPublicKey,<br>    data-to-be-quoted Digest }<br>BoundQuote-output ::= {<br>    ordinal        INTEGER,<br>    status         INTEGER,<br>    sig-blob      PKSignature }<br>Return Values<br>SSP_SUCCESS<br>SSP_CRYPTO_ERROR<br>SSP_BAD_DATA_ERROR<br>SSP_UNSEAL_ERROR |

Comments

The BoundQuote operation takes PKciphertext of type sspV1BoundKey containing a BoundKeyBlob of type BoundQuoteKey. If either of these conditions is not met, or if the sequence faills to decode, then the operation faills with SSP_CRYPTO_ERROR.

If Bound-to-PCR is set, the SSP checks that the current PCR value is as specified in the Bound-key-blob sequence. If it is not, the SSP returns SSP_CRYPTO_ERROR.

Finally, the SSP quotes the input message with the decrypted private key.

Access Policy

Allowed=FeatureEnable.MainEnable & (FeatureEnable. UsePrivKey==All|FeatureEnable.UsePrivKey==AuthSL
   & SLKnown & AuthPCR[CurrentSL].UsePrivKey)

Actions

The BoundQuote operation implements the following actions:

1. The SSP tests if the AlgorithmIdentifier in pk-sealed-blob is sspV1BoundKey.

2. The SSP internally decrypts SealedBlob according to the default implementation of RSAES-OAEP-DECRYPT as specified in PKCS #1 V2.1, obtaining a plaintext message M.

3. If the output of the decoding operation is "decoding error" return SSP_CRYPTO_ERROR with Secret set to zero.

4. Otherwise, the recovered message M should be a DER encoding of the form Bound-key-blob, with type Bound-QuoteKey. If not the SSP should emit SSP_CRYPTO_ERROR.

5. If bound-to-PCR is true, then the bound-to should be compared to the current PCR value. If the value is not the same, the SSP should output SSP_CRYPTO_ERROR.

6. The SSP then uses the recovered private key fragment and the public key to reconstruct the private key. The private key can be reconstructed as follows. In general, RSA keys are made of a number $N=p*q$ (N is the product of two prime numbers p and q.), and two exponents e (encryption exponent) and d (decryption exponent). N and e form the public key; d is the private key. In general, d is as long as N (e.g. 2048 bits). If the factorization of N is known (i.e., if p and q are known) then the private key d can be readily determined. Note that p and q are only half as long as N. So, rather than storing d as the private key, we store p. Then, given the public key N,e and p, the value $q=N/p$ can be computed, and then the value d determined given p and q.

The private key is then used to generate a signature message over the input message DataToBeSigned and the current PCR value according to the specification in the Quote operation defined above. If the function returns an error then return SSP_CRYPTO_ERROR with SigBlob set to 0.
  7. Return SSP_SUCCESS

| BoundPkDecrypt |
| --- |
| Definition<br>SSP_STATUS BoundPkDecrypt(<br>    [in] PKCiphertext BoundKeyBlob,<br>    [in] RSAPublicKey BoundPubKey,<br>    [in] PKCiphertext DataToBeDecrypted,<br>    [out] Secret decryptedData<br>)<br>Parameters<br>BoundPkDecrypt-Input ::= {<br>    ordinal        INTEGER,<br>    bound-key     BoundKeyBlob,<br>    bound-pub-key  RSAPublicKey,<br>    pk-sealed-blob  PKCiphertext }<br>BoundPkDecrypt-output ::= {<br>    ordinal        INTEGER,<br>    status         INTEGER,<br>    d-blob         Secret }<br>Return Values<br>SSP_SUCCESS<br>SSP_UNSEAL_ERROR<br>SSP_CRYPTO_ERROR<br>SSP_BAD_DATA_ERROR |

Comments

The BoundPkDecrypt operation takes PKciphertext of type sspV1BoundKey containing a BoundKeyBlob of type BoundDecryptKey. If either of these conditions is not met, or if the sequence fails to decode, then the operation faills with SSP_CRYPTO_ERROR.

If Bound-to-PCR is set, the SSP checks that the current PCR value is as specified in the Bound-key-blob sequence. If it is not, the SSP returns SSP_CRYPTO_ERROR.

Finally, the SSP decrypts the input message with the decrypted private key from the bound-blob.

Access Policy

Allowed=FeatureEnable.MainEnable & (FeatureEnable.UsePrivKey==All|FeatureEnable.UsePrivKey==AuthSL
  & SLKnown & AuthPCR[CurrentSL].UsePrivKey)

Actions

The BoundPkDecrypt operation implements the following actions:

1. The SSP tests if the AlgorithmIdentifier in pk-sealed-blob is sspV1BoundKey.

2. The SSP internally decrypts SealedBlob according to the default implementation of RSAES-OAEP-DECRYPT as specified in PKCS #1 V2.1, obtaining a plaintext message M.

3. If the output of the decoding operation is "decoding error," return SSP_CRYPTO_ERROR with Secret set to zero.

4. Otherwise, the recovered message M should be a DER encoding of the form Bound-key-blob, with type BoundDecryptKey. If not, the SSP should emit SSP_CRYPTO_ERROR.

5. If bound-to-PCR is true, then the bound-to should be compared to the current PCR value, if the value is not the same, the SSP should output SSP_CRYPTO_ERROR.

6. The SSP recovers the private key using the provided public key. The private key can be recovered as discussed above in the BoundQuote operation. It then uses the recovered private bound-key to decrypt the pk-sealed-blob using the default implementation of RSAES-OAEP-DECRYPT as specified in PKCS # 1 V2.1, obtaining a plaintext message M.

7. The SSP sets d-blob to M.
8. Return SSP_SUCCESS.

| BoundPkUnseal |
| --- |
| Definition<br>SSP_STATUS BoundPKUnseal(<br>    [in] PKCiphertext BoundKeyBlob,<br>    [in] RSAPublicKey BoundPubKey,<br>    [in] PKCiphertext DataToBeUnsealed<br>    [out] Secret decryptedData<br>)<br>Parameters<br>BoundPKUnseal-Input ::= {<br>    ordinal        INTEGER,<br>    bound-key     BoundKeyBlob,<br>    bound-pub-key  RSAPublicKey,<br>    pk-sealed-blob  PKCiphertext }<br>BoundPKUnseal-output ::= {<br>    ordinal        INTEGER,<br>    status         INTEGER,<br>    d-blob         Secret }<br>Return Values<br>SSP_SUCCESS<br>SSP_UNSEAL_ERROR<br>SSP_CRYPTO_ERROR<br>SSP_BAD_DATA_ERROR |

Comments

The BoundPkUnseal operation takes PKciphertext of type sspV1BoundKey containing a BoundKeyBlob of type BoundPKUnsealKey. If either of these conditions is not met, or if the sequence fails to decode, then the operation faills with SSP_CRYPTO_ERROR.

If Bound-to-PCR is set, the SSP checks that the current PCR value is as specified in the Bound-key-blob sequence. If it is not, the SSP returns SSP_CRYPTO_ERROR.

Finally, the SSP uses PK-Unseal to unseal the input message with the decrypted private key from the bound-blob.

Access Policy

Allowed=FeatureEnable.MainEnable & (FeatureEnable.UsePrivKey==All|FeatureEnable.UsePrivKey==AuthSL
  & SLKnown & AuthPCR[CurrentSL].UsePrivKey)

Actions

The BoundPkUnseal operation must implement the following steps:

1. The SSP tests if the AlgorithmIdentifier in pk-sealed-blob is sspV1BoundKey.

2. The SSP internally decrypts SealedBlob according to the default implementation of RSAES-OAEP-DECRYPT as specified in PKCS #1 V2.1, obtaining a plaintext message M.

3. If the output of the decoding operation is "decoding error," return SSP_CRYPTO_ERROR with Secret set to zero.

4. Otherwise, the recovered message M should be a DER encoding of the form Bound-key-blob, with type BoundDecryptKey. If not, the SSP should emit SSP_CRYPTO_ERROR.

5. If bound-to-PCR is true, then the bound-to should be compared to the current PCR value. If the value is not the same, the SSP should output SSP_CRYPTO_ERROR.

6. The SSP recreates the private key using the bound key blob. The private key can be recovered as discussed above in the BoundQuote operation. It then uses the recovered private bound-key to unseal the pk-sealed-blob using the steps described in the PK_Unseal command.

7. If the PCR named in the unsealed blob does not match the current PCR, the SSP returns SSP_CRYPTO_ERROR.

8. Otherwise, the SSP sets d-blob to M.
9. Return SSP_SUCCESS.

---

GenBoundKey

---

Definition
SSP_STATUS GenBoundKey(
    [in] BoundKeyType KeyType,
    [in] BOOL BoundToPcr,
    [in] DIGEST BoundTo[2],
    [in] BOOL migrateable,
    [in] DIGEST migrationAuthority,
    [in] BOOL exportable,
    [in] DIGEST exportAuthority,
    [in] DIGEST SigNonce,
    [out] BoundKey bound-key,
    [out] PKPublickey newPubKey,
    [out] PKSignature boundKeyQuoteBlob
)
Parameters
GenBoundKey-Input ::= {
    ordinal        INTEGER,
    key-type       Bound-key-type,
    bound-to-pcr   BOOL,
    bound-to       DigestPair,
    migrateable    BOOL,
    migrate-auth   Digest,
    exportable     BOOL,
    export-auth    Digest,
    sig-nonce      Digest
}
GenBoundKey-output ::= {
    ordinal        INTEGER,
    status         INTEGER,
    bound-blob     PKCiphertext,
    bound-pub      RSAPublicKey,
    sig-blob       PKSignature }
Return Values
SSP_SUCCESS
SSP_BAD_DATA_ERROR

---

Comments

The GenBoundKey operation causes the SSP to generate a new bound-key blob containing the newly generated private key. The bound-key blob is encrypted with the SSP's own public key.

GenBoundKey also outputs the public key of the newly generated key-pair, a quote-signature that indicates that the SSP generated the key, its characteristics, and the PCR value when the key was generated.

The caller of GenBoundKey also indicates the type of bound-key to be created: whether it is for signing, quoting, unsealing with BoundPkUnseal, or decrypting with BoundPkDecrypt. The caller also specifies whether the bound-key should be bound to a PCR, and if so, the PCR value to which it is bound.

Access Policy
Allowed=FeatureEnable.MainEnable & (FeatureEnable. UsePrivKey==All|FeatureEnable.UsePrivKey==AuthSL
    & SLKnown & AuthPCR[CurrentSL].UsePrivKey)

Actions
The GenBoundKey operation implements the following actions:

1. The SSP generates a new public private RSA key-pair. The SSP can optionally generate key-pairs when the SSP is otherwise idle, and store a small cache of keys in non-volatile memory for immediate retrieval.

2. The SSP internally generates a bound-key structure containing the newly generate private key and the bound-key type and other parameters provided by the caller.

3. The SSP encrypts the bound-key blob with the platform public encryption key.

4. The SSP generates a signed blob of a bound-key-pub-info containing the properties of the newly created key, the PCR values at the time of key creation and the supplied nonce.

5. The SSP outputs the encrypted bound-key blob, the newly generated public key, and the quoted key blob.

6. Return SSP_SUCCESS.

---

BoundKeyMigrate

---

Definition
SSP_STATUS BoundKeyMigrate(
    [in] PKCiphertext BoundKeyBlob,
    [in] RSAPublicKey PubPartOfBoundKey,
    [in] BOUND_MIGRATION_INFO MigrationInfo,
    [in] RSA_SIG SigOnMigrationInfo
)
Parameters
GenBoundKey-Input ::= {
    ordinal         INTEGER,
    migration-info    Bound-migration-info,
    migration-pubkey RSAPublicKey,
    migration-auth    PKSignature
}
GenBoundKey-output ::= {
    ordinal        INTEGER,
    status         INTEGER,
    re-bound-blob   PKCiphertext,
}
Return Values
SSP_SUCCESS
SSP_BAD_DATA_ERROR

---

Comments

The BoundKeyMigrate operation instructs the SSP to re-bind a key to a different PCR value in a controlled manner. The original key-creator, local or remote, names the migration-authorization entity. Only bound keys marked migrateable can be migrated, and these will only be migrated if the SSP is provided with an appropriated signed Boundmigration-info structure. Appropriately signed means signed with the public key whose digest is contained within the bound key blob. The other bound key attributes are not changed.

Access Policy
Allowed=FeatureEnable.MainEnable & (FeatureEnable. UsePrivKey==All|FeatureEnable.UsePrivKey==AuthSL
    & SLKnown & AuthPCR[CurrentSL].UsePrivKey)

Actions
The BoundKeyMigrate operation implements the following actions:

1. The SSP internally decrypts the bound-key structure and interprets it as a Bound-key-blob. If the decoding faills, the SSP returns SSP_CRYPTO_ERROR.

2. The SSP validates that Bound-export-info refers to the same key, that the signature is properly formed, and that the digest of the public key of the signer is as named in the 'migrateable' field of the Bound-key-blob.

3. The SSP checks that the key is migrateable. If not, the SSP returns SSP_CRYPO_ERROR 4. If the key is bound to a PCR, the SSP checks that the current PCR is that named in the key-blob.

5. The SSP replaces the PCR value with that named in the dest-PCR field of the Bound-migration-info.

6. The SSP re-encrypts the bound-key-blob, and exports the re-encrypted structure.

6. Return SSP_SUCCESS.

| BoundKeyExport |
| --- |
| Definition<br>SSP_STATUS BoundKeyExport(<br>    [in] PKCiphertext BoundKeyBlob,<br>    [in] RSAPublicKey PubPartOfBoundKey,<br>    [in] BOUND_EXPORT_INFO ExportInfo,<br>    [in] RSA_SIG SigOnExportInfoInfo,<br>    [out] PKCipherText ReBoundBlob<br>)<br>Parameters<br>BoundKeyExport-Input ::= {<br>    ordinal        INTEGER,<br>    bound-key     PKCipherText,<br>    bound-pub-key RSAPublicKey,<br>    export-info   Bound-export-info,<br>    export-auth   PKSignature,<br>}<br>GenBoundKey-output ::= {<br>    ordinal        INTEGER,<br>    status         INTEGER,<br>    re-bound-blob  PKCiphertext,<br>}<br>Return Values<br>SSP_SUCCESS<br>SSP_BAD_DATA_ERROR |

Comments

The BoundKeyExport operation instructs the SSP to export the private part of a bound key to a remote entity in a format consistent with bound keys on the source device in a controlled manner. The original key-creator, local or remote, names the export-authorization entity. Only bound keys marked exportable can be exported, and these will only be exported if the SSP is provided with an appropriated signed Bound-export-info structure. Appropriately signed means signed with the public key whose digest is contained within the original bound key blob. BoundKeyExport allows appropriately authorized callers to specify the public key and PCR value of the target entity to which the key should be rebound. There is no specific requirement that the external entity be an SSP, but the newly bound blob follows bound-key conventions to allow remote SSPs to consume exported bound keys directly.

Access Policy

Allowed=FeatureEnable.MainEnable & (FeatureEnable.UsePrivKey==All|FeatureEnable.UsePrivKey==AuthSL
 & SLKnown & AuthPCR[CurrentSL].UsePrivKey)

Actions

The BoundKeyExport operation implements the following actions:

1. The SSP internally decrypts the bound-key structure and interprets it as a Bound-key-blob. If the decoding faills, the SSP returns SSP_CRYPTO_ERROR.

2. The SSP validates that Bound-export-info refers to the same key, that the signature is properly formed, and that the digest of the public key of the signer is as named in the 'export' field of the Bound-key-blob.

3. The SSP checks that the key is exportable. If not, the SSP returns SSP_CRYPO_ERROR.

4. If the key is bound to a PCR, the SSP checks that the current PCR is that named in the key-blob.

5. The SSP internally generates a new bound-key-blob structure containing the parameters from the original bound-key-blob structure and the new PCR value supplied in Bound-export-info. All other parameters remain the same.

6. The SSP encrypts the new bound-key blob with the public encryption key supplied in Bound-export-info.

7. The newly bound key is exported.

8. Return SSP_SUCCESS.

General Computer Environment

Figure 12:
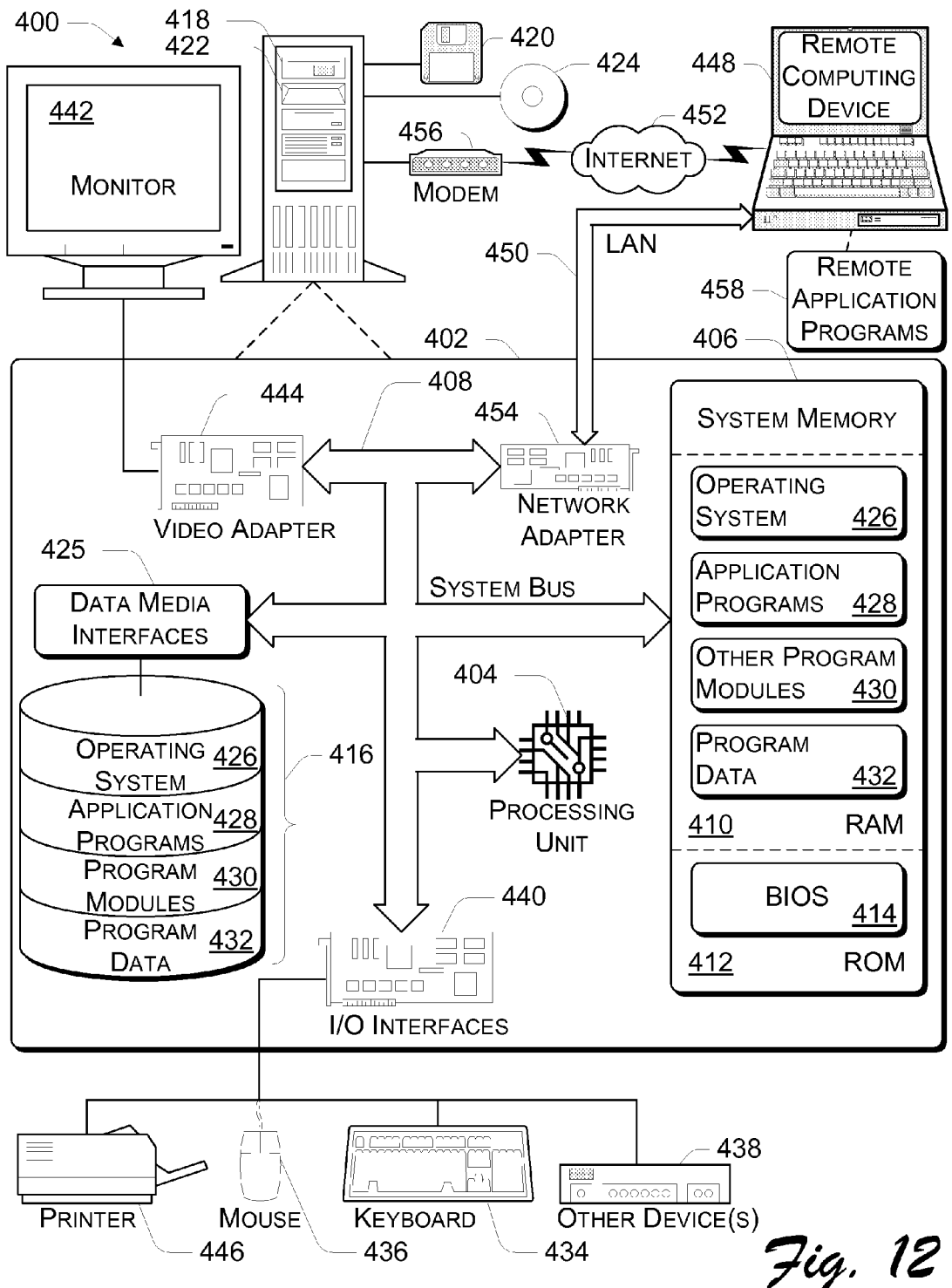
FIG. 12 illustrates a general computer environment, which can be used to implement the techniques described herein.

FIG. 12 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be used, for example, to implement principal 102 and guard 104 of FIG. 1, or the layers of FIG. 2. The components of computer 402 can include, but are not limited to, one or more processors or processing units 404 (optionally including one or more security processors or coprocessors (such as an SSP) and/or one or more cryptographic processors or coprocessors), a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 12 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk Drive 422 are each connected to the system bus 408 by one or more data media interfaces 425. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer storage readable media having stored thereon a plurality of instructions that, when executed by one or more processors of a computing device, causes the one or more processors to perform acts comprising:

invoking an unseal operation in order to have a bit string decrypted, passing the bit string as an input to the unseal operation, the bit string including identifiers of multiple target programs that are allowed to access at least a portion of the decrypted bit string; and receiving, in response to invoking the unseal operation, the at least a portion of the decrypted bit string only if the plurality of instructions are one of the identified multiple target programs, wherein the data is decrypted using a symmetric cipher.

2. One or more computer storage media as recited in claim 1, wherein each of the identifiers of multiple target programs is a digest generated by applying a cryptographic hash function to one of the multiple target programs.

3. One or more computer storage media as recited in claim 1, wherein the input to the unseal operation is a pointer to the bit string.

4. One or more computer storage media as recited in claim 1, the receiving the at least a portion of the decrypted bit string further comprising receiving the at least a portion of the decrypted bit string only if a time constraint for when the data can be unsealed is satisfied.

5. One or more computer storage media as recited in claim 1, the receiving the at least a portion of the decrypted bit string further comprising receiving the at least a portion of the decrypted bit string only if a logical formula identified in the bit string evaluates to true.

6. One or more computer storage media as recited in claim 1, the receiving the at least a portion of the decrypted bit string further comprising receiving the at least a portion of the decrypted bit string only if execution of a program identified in the bit string returns an indication of true.

7. One or more computer storage media having stored thereon a plurality of instructions that, when executed by one or more processors of a computing device, causes the one or more processors to perform acts comprising:
    invoking an unseal operation in order to obtain data from a sealed bit string, the sealed bit string including identifiers of multiple programs that are allowed to access the data; and
    receiving, in response to invoking the unseal operation, the data from the sealed bit string only if one or more conditions that are to be satisfied in order for the data to be unsealed are satisfied, the one or more conditions including the plurality of instructions being one of the identified multiple programs.

8. One or more computer storage media as recited in claim 7, wherein one of the one or more conditions comprises a time constraint for when the data can be unsealed.

9. One or more computer storage media as recited in claim 8, wherein the time constraint comprises one or more times of day when the data can be unsealed.

10. One or more computer storage media as recited in claim 8, wherein the time constraint comprises one or more days of a week when the data can be unsealed.

11. One or more computer storage media as recited in claim 7, wherein one of the one or more conditions comprises a logical formula to be evaluated, and wherein the data can be unsealed only if the logical formula evaluates true.

12. One or more computer storage media as recited in claim 7, wherein one of the one or more conditions comprises a program to be executed, and wherein the data can be unsealed only if execution of the program returns an indication of true.

13. A method comprising:
    invoking an unseal operation in order to obtain data from a sealed bit string, the sealed bit string including identifiers of multiple programs that are allowed to access the data; and
    receiving, in response to invoking the unseal operation, the data from the sealed bit string only if one or more conditions that are to be satisfied in order for the data to be unsealed are satisfied, the one or more conditions including the plurality of instructions being one of the identified multiple programs.

14. A method as recited in claim 13, wherein one of the one or more conditions comprises a time constraint for when the data can be unsealed.

15. A method as recited in claim 13, wherein one of the one or more conditions comprises a logical formula to be evaluated, and wherein the data can be unsealed only if the logical formula evaluates true.

16. A method as recited in claim 13, wherein one of the one or more conditions comprises a program to be executed, and wherein the data can be unsealed only if execution of the program returns an indication of true.

17. A method as recited in claim 13, wherein each of the identifiers of multiple programs is a digest generated by applying a cryptographic hash function to one of the multiple programs.

* * * * *

UNITED STATES PATENT AND TRADEMARK OFFICE
CERTIFICATE OF CORRECTION

PATENT NO. : 7,424,612 B2
APPLICATION NO. : 11/557620
DATED : September 9, 2008
INVENTOR(S) : England et al.

Page 1 of 1

It is certified that error appears in the above-identified patent and that said Letters Patent is hereby corrected as shown below:

In column 21, line 23, after "PCR[0]" insert -- ‖ --.

In column 39, line 1, in Claim 1, delete "receiving," and insert -- receive, --, therefor.

Signed and Sealed this
Third Day of May, 2011

David J. Kappos
*Director of the United States Patent and Trademark Office*